United States Patent
Tam et al.

(10) Patent No.: US 9,563,734 B2
(45) Date of Patent: Feb. 7, 2017

(54) CHARACTERIZING CELL USING INPUT WAVEFORM GENERATION CONSIDERING DIFFERENT CIRCUIT TOPOLOGIES

(71) Applicant: TAIWAN SEMICONDUCTOR MANUFACTURING COMPANY LTD., Hsinchu (TW)

(72) Inventors: King-Ho Tam, Hsinchu County (TW); Yen-Pin Chen, Taipei (TW); Wen-Hao Chen, Hsin-Chu (TW); Chung-Hsing Wang, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 363 days.

(21) Appl. No.: 14/150,350

(22) Filed: Jan. 8, 2014

(65) Prior Publication Data

US 2015/0193569 A1 Jul. 9, 2015

(51) Int. Cl.
*G06F 9/455* (2006.01)
*G06F 17/50* (2006.01)

(52) U.S. Cl.
CPC ....... *G06F 17/5072* (2013.01); *G06F 17/5031* (2013.01); *G06F 17/5068* (2013.01); *G06F 17/5081* (2013.01); *G06F 2217/84* (2013.01)

(58) Field of Classification Search
USPC ........................................................ 716/113
See application file for complete search history.

(56) References Cited

U.S. PATENT DOCUMENTS

| 6,532,576 | B1 | 3/2003 | Mbouombouo et al. |
| 7,398,495 | B1 | 7/2008 | Schreiber et al. |
| 2005/0232066 | A1* | 10/2005 | Ishibashi ............. G06F 17/5036 365/189.03 |

FOREIGN PATENT DOCUMENTS

| JP | 09259170 A | 10/1997 |
| JP | H09-259170 Y | 10/1997 |
| JP | 10275166 A | 10/1998 |
| JP | 2005122498 A | 5/2005 |
| JP | 2005-332378 A | 12/2005 |
| JP | 2005332378 A | 12/2005 |
| TW | 201003442 A1 | 1/2010 |
| TW | 20124595 A1 | 11/2012 |
| TW | 201245995 A1 | 11/2012 |

OTHER PUBLICATIONS

Office Action issued by TIPO on Oct. 13, 2015.
Office action issued by Korean Intellectual Property Office on Nov. 18, 2015.
"Virtuso Liberate Reference Manual" a user manual of Virtuso Liberate from Cadence Design System Inc. (pp. 296 and 297).
"Liberty NCX User Guide" a user manual of Liberty NCX from Synopsys Inc. (p. 3-37 to p. 3-39).
Office action issued by Taiwan Property Intellectual Office on May 20, 2016.
Notice of Allowance of Patent issued by Korean Intellectual Property Office on Sep. 26, 2016.

* cited by examiner

*Primary Examiner* — Eric Lee
(74) *Attorney, Agent, or Firm* — Chun-Ming Shih

(57) ABSTRACT

In some embodiments, in a method performed by at least one processor, a cell is characterized, by the at least one processor, with respect to an input transition characteristic considering different circuit topologies of a pre-driver driving the cell resulting in the same input transition characteristic.

20 Claims, 24 Drawing Sheets

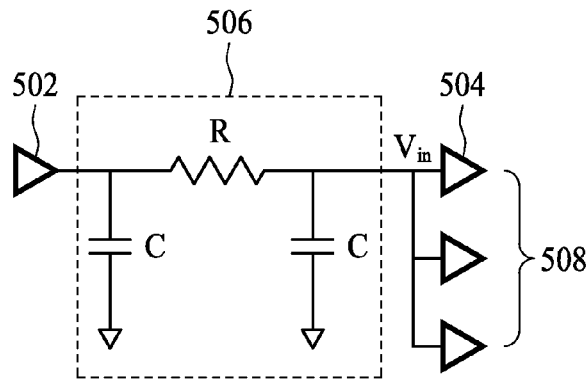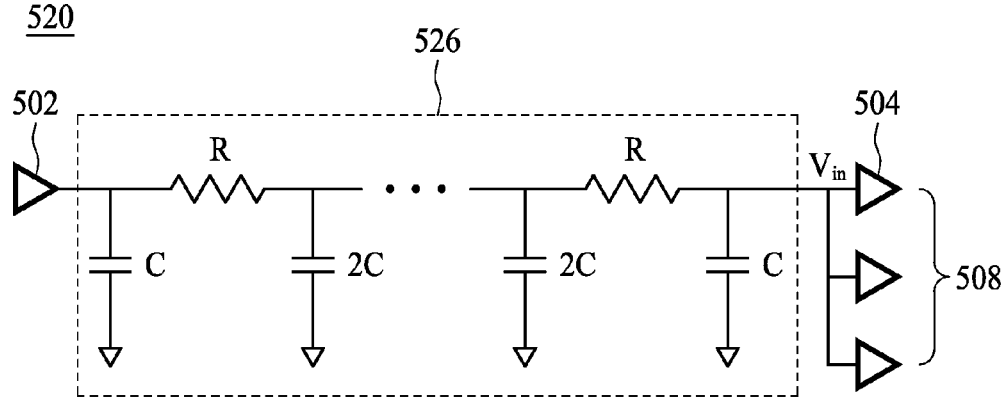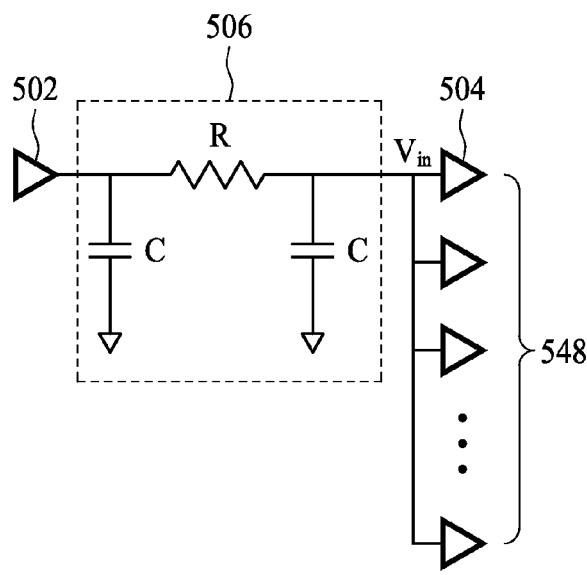
FIG. 5

| 1st input transition characteristic | |
|---|---|
| waveform of average circuit topology | fully characterized model |
| waveform of high R circuit topology | fully characterized model |
| waveform of high FO circuit topology | fully characterized model |
| 2nd input transition characteristic | |
| waveform of average circuit topology | fully characterized model |
| waveform high R circuit topology | fully characterized model |
| waveform high FO circuit topology | fully characterized model |

| 1st input transition characteristic | |
|---|---|
| average R and FO | fully characterized model |
| high R and average FO | characterized sensitivity |
| average R and high FO | characterized sensitivity |
| 2nd input transition characteristic | |
| average R and FO | fully characterized model |
| high R and average FO | characterized sensitivity |
| average R and high FO | characterized sensitivity |

| 1st input transition characteristic | |
|---|---|
| 1st selected tail characteristic | characterized sensitivity w.r.t. 1st fully characterized model |
| 2nd selected tail characteristic | 1st fully characterized model |
| 3rd selected tail characteristic | characterized sensitivity w.r.t. 1st fully characterized model |
| 4th selected tail characteristic | characterized sensitivity w.r.t. 2nd fully characterized model |
| 5th selected tail characteristic | 2nd fully characterized model |
| 6th selected tail characteristic | characterized sensitivity w.r.t. 2nd fully characterized model |
| 2nd input transition characteristic | |
| 1st selected tail characteristic | characterized sensitivity w.r.t. 3rd fully characterized model |
| 2nd selected tail characteristic | 3rd fully characterized model |
| 3rd selected tail characteristic | characterized sensitivity w.r.t. 3rd fully characterized model |
| 4th selected tail characteristic | characterized sensitivity w.r.t. 4th fully characte rized model |
| 5th selected tail characteristic | 4th fully characterized model |
| 6th selected tail characteristic | characterized sensitivity w.r.t. 4th fully characterized model |

CHARACTERIZING CELL USING INPUT WAVEFORM GENERATION CONSIDERING DIFFERENT CIRCUIT TOPOLOGIES

BACKGROUND

In a design flow for an integrated circuit (IC) chip, static timing analysis for estimating delays in electronic circuits is employed in various stages to, for example, verify correct operations and optimize performance of the IC chip design. One factor that affects accuracy of delay calculation in static timing analysis is the resemblance of a predetermined input waveform used to characterize a cell for delay calculation to a propagated input waveform to the cell in a circuit which static timing analysis is performed on. However, as technology progresses, effects of, for example, increased length in interconnects for circuit connection and increased Miller capacitance in miniaturized transistors and non-planner transistors cause distortion in the propagated input waveform with respect to the predetermined input waveform. When the distortion in the propagated input waveform is ignored, accuracy in delay calculation is compromised.

BRIEF DESCRIPTION OF THE DRAWINGS

The details of one or more embodiments of the disclosure are set forth in the accompanying drawings and the description below. Other features and advantages of the disclosure will be apparent from the description, drawings and claims.

FIG. 5 includes schematic circuit diagrams of the different netlists of the pre-driver driving the cell configured in the different circuit topologies in accordance with some embodiments.

FIG. 15 is a schematic diagram for a timing library of the cell in accordance with some embodiments.

FIG. 17 is a schematic diagram for a timing library of the cell in accordance with some embodiments.

FIG. 20 is a schematic diagram of another timing library of the cell in accordance with some embodiments.

Like reference symbols in the various drawings indicate like elements.

DETAIL DESCRIPTION

Figure 1:
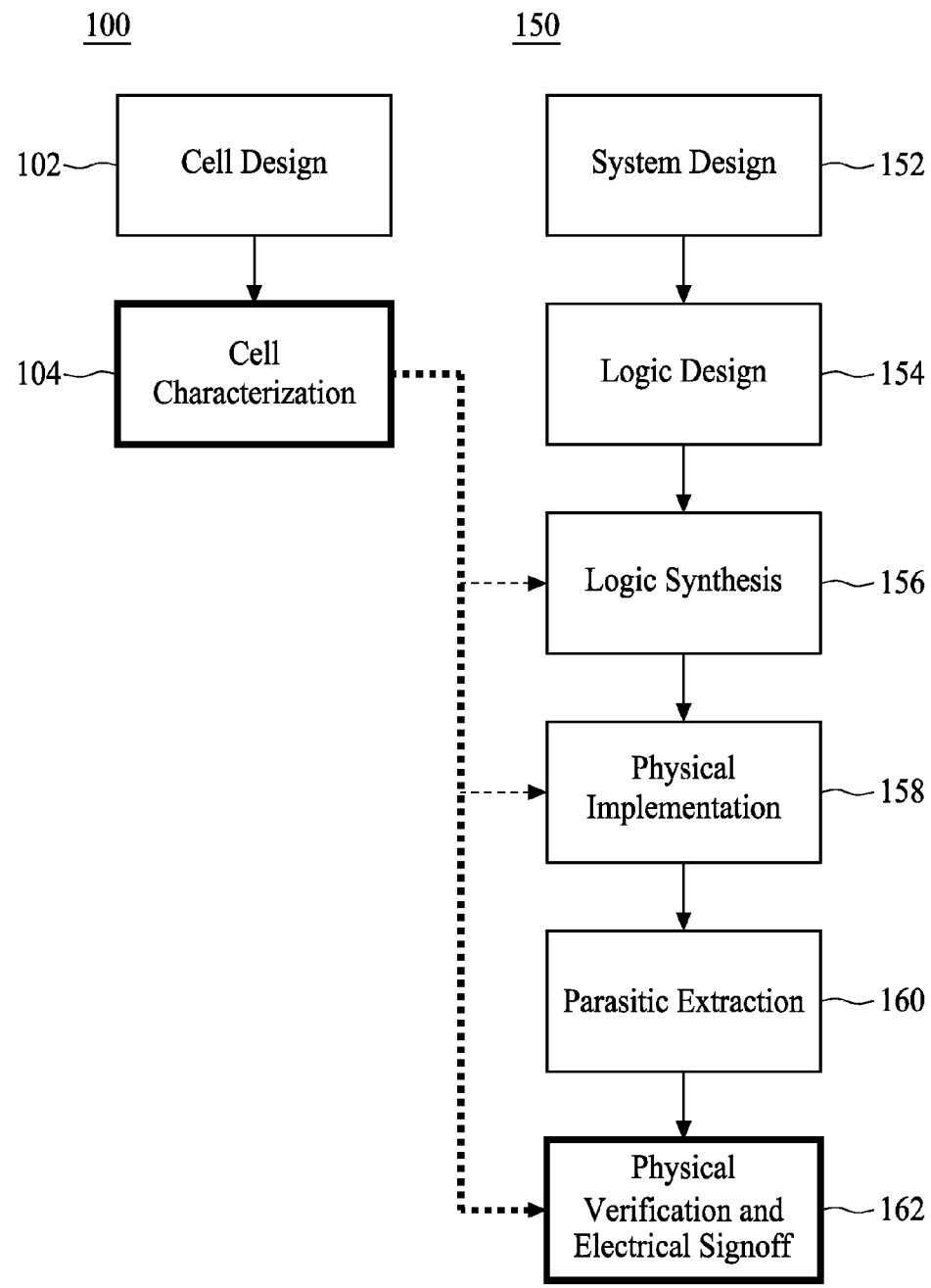
FIG. 1 is a flow chart of a cell design flow and a chip design flow of an IC chip in accordance with some embodiments.

Embodiments, or examples, of the disclosure illustrated in the drawings are now described using specific languages. It will nevertheless be understood that no limitation of the scope of the disclosure is thereby intended. Any alterations and modifications in the described embodiments, and any further applications of principles described in this document are contemplated as would normally occur to one of ordinary skill in the art to which the disclosure relates. Reference numbers may be repeated throughout the embodiments, but this does not necessarily require that feature(s) of one embodiment apply to another embodiment, even if they share the same reference number.

Some embodiments have one or a combination of the following features and/or advantages. In some embodiments, a cell is characterized with respect to an input transition characteristic considering different circuit topologies of a pre-driver driving the cell resulting in the same input transition characteristic. In some embodiments, by further performing waveform matching considering the different circuit topologies, an output response of the cell is generated using a model characterized using an input waveform better resembles the distorted propagated input waveform and is more accurate. In some embodiments, by further applying sensitivity correction considering the different circuit topologies, the output response of the cell is corrected with respect to effects of distortion in the propagated input waveform and is more accurate. In some embodiments, by adopting an input waveform with a representative tail characteristic obtained considering the different circuit topologies, the output response of the cell is generated using a model characterized using an input waveform more likely better resembles the distorted propagated input waveform and is more likely more accurate.

FIG. 1 is a flow chart of a cell design flow 100, and a chip design flow 150 of an integrated circuit (IC) chip in accordance with some embodiments. The flows 100 and 150 utilize one or more electronic design automation (EDA) tools to carry out one or more stages or operations in the flows 100 and 150.

The chip design flow 150 aims at implementing the IC chip design from a high-level specification to a physical layout which is verified for, for example, functionality, performance, and power. The cell design flow 100 provides physical design of cells and abstraction of the physically designed cells for the cells to be employed as building blocks in the chip design flow 150. In some embodiments, the cell design flow 100 is carried out separately from and prior to certain stages of the chip design flow 150 as illustrated in FIG. 1. In other embodiments, the cell design flow 100 is incorporated into the chip design flow 150.

In some embodiments, the cell design flow 100 includes a cell design stage 102 and a cell characterization stage 104.

At the cell design stage 102, cell design is performed at the transistor level and the circuits of the cells are physically laid out and verified according to specifications, technology-related information, and design rules.

At the cell characterization stage 104, the physically implemented cells are characterized to create, for example, timing models and power models for the cells. In some embodiments, netlists of the cells, the physically implemented cells and the models for the cells are collected in a standard cell library and available for use. The term "netlist" used here and throughout the present disclosure refers to a graphical-based and/or a text-based representation of a circuit. Some embodiments of the present disclosure can be used at this stage or other stages of the cell design flow 100.

In some embodiments, the chip design flow 150 includes a system design stage 152, a logic design stage 154, a logic synthesis stage 156, a physical implementation 158, a parasitic extraction stage 160 and a physical verification and electrical signoff stage 162.

At the system design stage 152, the designer describes the IC chip in terms of larger modules that serve specific functions, respectively. Further, exploration for options include design architectures is performed to consider, for example, tradeoffs in optimizing design specifications and cost. Timing requirements of the IC chip are specified at this stage.

At the logic design stage 154, the modules for the IC chip are described at the register transfer level (RTL) using the VHDL or Verilog, and are verified for functional accuracy.

At the logic synthesis stage 156, the modules for the IC chip described in RTL are translated into a gate-level netlist. In some embodiments, technology mapping of the logic gates and registers to available cells in the created standard cell library from the cell design flow 100 also happen at this stage. After logic synthesis is done, the IC chip design has gone through the front-end design process and enters into a back-end physical design process in subsequent stages.

At the physical implementation stage 158, the gate-level netlist is partitioned into blocks and a floorplan for the blocks is created. Mapped cells of logic gates and registers in the blocks are placed at specific locations in a chip area of the IC chip design. A clock network is synthesized and interconnects connecting the cells are routed. In some embodiments, timing-driven placement and routing of the IC chip design are performed to plan for timing closure at an earlier design stage. After this stage, a placed-and-routed layout of the IC chip is created.

At the parasitic extraction stage 160, a physical netlist is extracted from the layout of the IC chip. The physical netlist includes parasitics such as parasitic resistors and capacitors introduced by the interconnects to the cells.

At the physical verification and electrical signoff stage 162, timing analysis and post-route optimization are performed on the physical netlist to ensure timing closure. The timing models in the cell library are used for delay calculation during timing analysis. Some embodiments of the present disclosure can be used at this stage or other stages of the chip design flow 150. The layout of the IC chip is checked to ensure correspondence to the gate-level netlist, and to ensure clean of, for example, electrical issues and lithographic issues for manufacturing. Incremental fixing can be performed to achieve final signoff of the design before tape-out.

The cell design flow 100 and the chip design flow 150 in FIG. 1 are exemplary. Other sequence of the stages or operations, partition of the stages, or additional stages or operations before, between or after the stages shown are within the applicable scope of the present disclosure.

Figure 2:
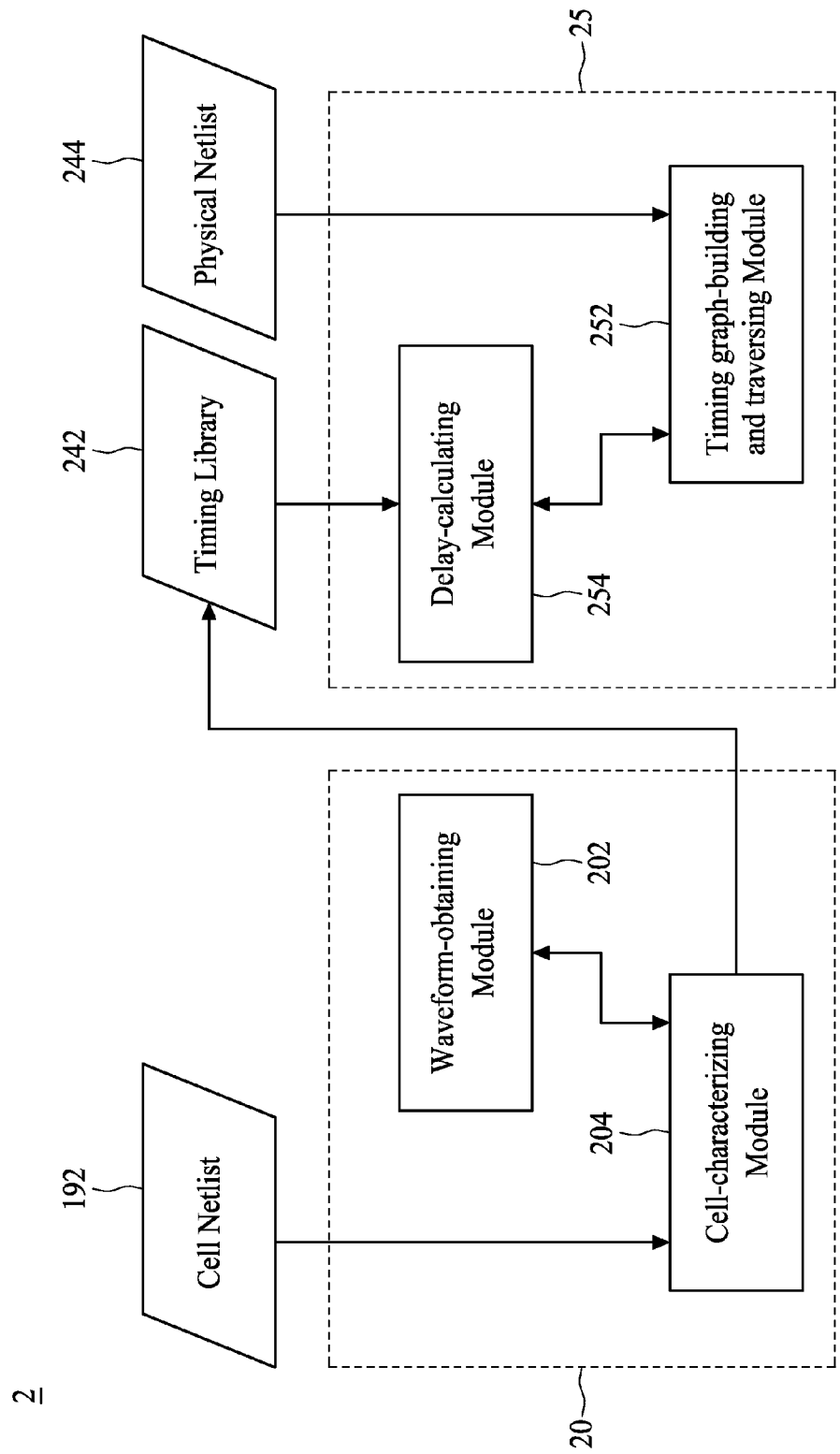
FIG. 2 is a functional block diagram of a software system for creating a timing library, and performing timing analysis using the timing library in accordance with some embodiments.

FIG. 2 is a functional block diagram of a software system 2 for creating a timing library, and performing timing analysis using the timing library in accordance with some embodiments. The software system 2 includes a library-creating tool 20 and a static timing analysis tool 25. The library-creating tool 20 is configured to characterize a cell for delay calculation using input waveform generation considering different circuit topologies generating the same input transition characteristic. The library-creating tool 20 is used in, for example, the cell characterization stage 104 in the cell design flow 100 in FIG. 1. The library-creating tool 20 includes a waveform-obtaining module 202 and a cell-characterizing module 204. The waveform-obtaining module 202 is configured to receive an input transition characteristic and information of different circuit topologies of a pre-driver driving the cell to be considered from, for example, the cell-characterizing module 204 and obtain one representative input waveform for the different circuit topologies or different input waveforms for the different circuit topologies, respectively. The cell-characterizing module 204 is configured to receive a cell netlist 192 and one or more input waveforms with the input transition characteristic from the waveform-obtaining module 202, and characterize the cell with respect to the one or more input waveforms to create one or more entry in a timing library 242 for delay calculation. The static timing analysis tool 25 is configured to receive a physical netlist 244 obtained, for example, in the parasitic extraction stage 160 in FIG. 1, and perform static timing analysis on the physical netlist 244 using the timing library 242. The static timing analysis tool 25 is used in, for example, the physical verification and electrical signoff stage 162 in the chip design flow 150 in FIG. 1. The static timing analysis tool 25 includes a timing graph-building and traversing module 252 and a delay-calculating module 254. The timing graph-building and traversing module 252 is configured to formulate the physical netlist into a timing graph and traversing the timing graph to perform input waveform propagation for delay calculation. The delay-calculating module 254 is configured to receive the timing library 242 from the cell-characterizing module 204, and a type of the cell and a propagated input waveform to the cell from the timing graph-building and traversing module 252, and generate an output response of the cell as a propagated input waveform to a subsequent cell.

Figure 3:
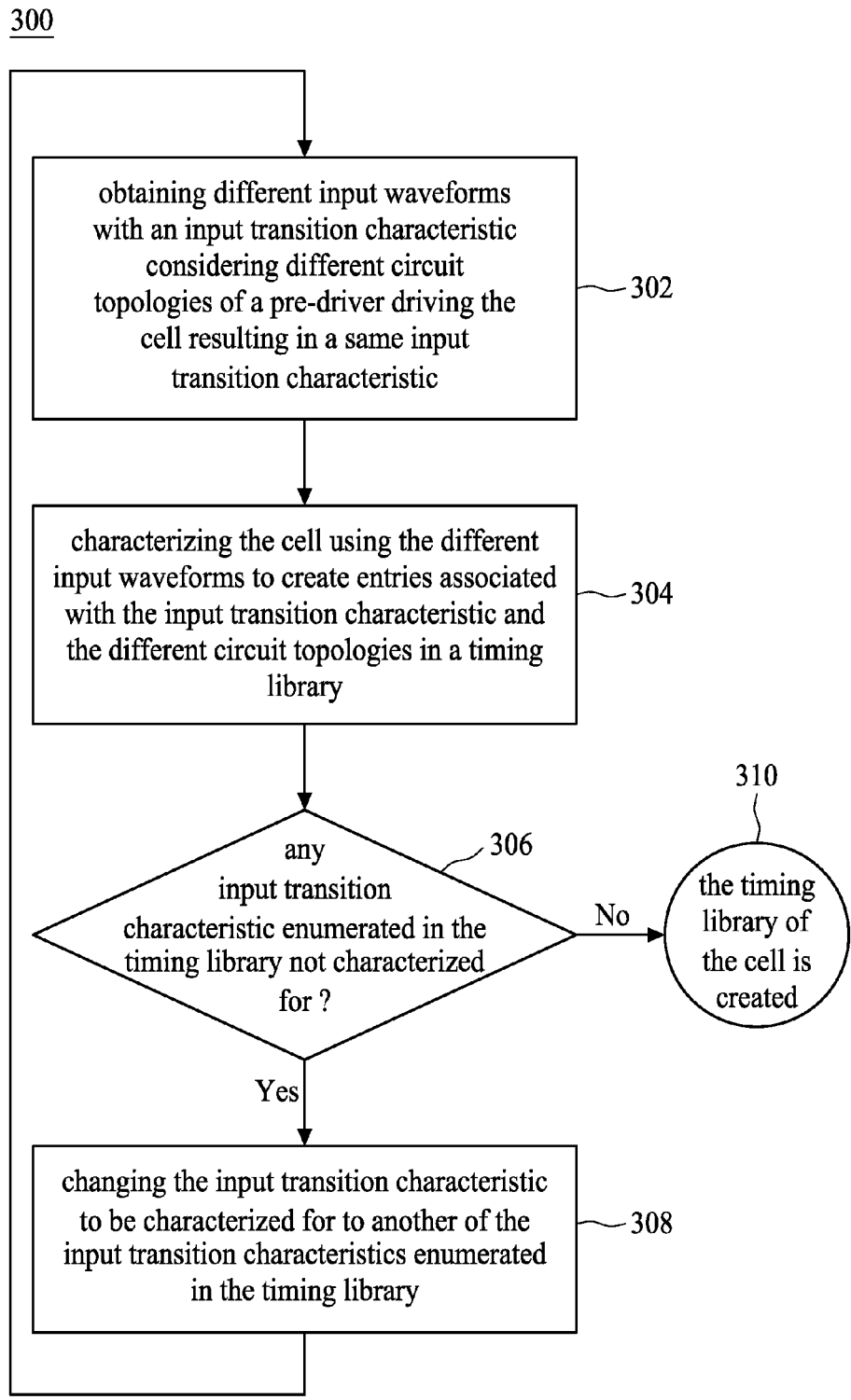
FIG. 3 is flow chart of a method for characterizing a cell for delay calculation using input waveform generation considering different circuit topologies generating the same input transition characteristic in accordance with some embodiments.

FIG. 3 is flow chart of a method 300 for characterizing a cell for delay calculation using input waveform generation considering different circuit topologies generating the same input transition characteristic in accordance with some embodiments. In some embodiments, the method 300 is performed in the cell characterization stage 104 in the cell design flow 100 in FIG. 1. In some embodiments, the method 300 is performed by the library-creating tool 20 in FIG. 2. In operation 302, different input waveforms corresponding to different circuit topologies of a pre-driver driving the cell resulting in a same input transition characteristic are obtained. In operation 304, the cell is characterized using the different input waveforms to create entries associated with the input transition characteristic and the different circuit topologies in a timing library. In operation 306, whether there is any input transition characteristic enumerated in the timing library not characterized for is checked. If so, then in operation 308, the input transition characteristic to be characterized for is changed to another of the input transition characteristic enumerated in the timing library and the method loops back to operation 302. If not, then at a connecting or terminating point 310, the timing library of the cell is created and is available for use.

Figure 4:
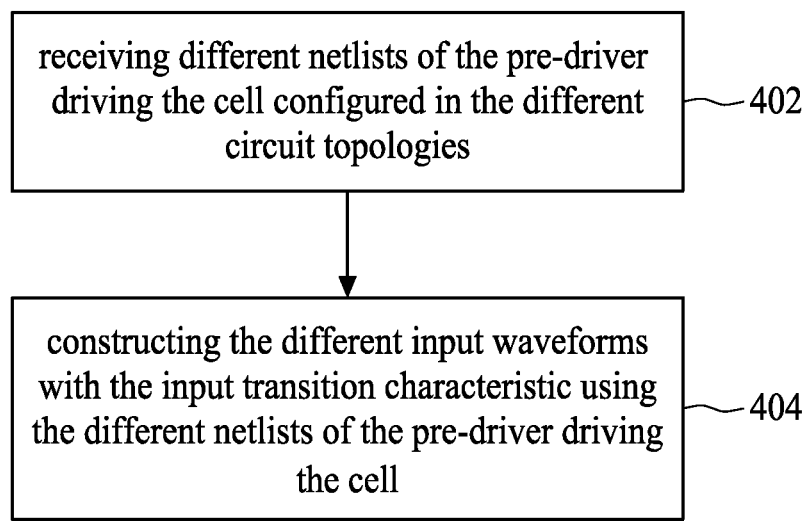
FIG. 4 is a flow chart of a method implementing the operation 302 in FIG. 3 in accordance with some embodiments.

In operation 302 in FIG. 3, different input waveforms corresponding to different circuit topologies of a pre-driver driving the cell resulting in the same input transition characteristic are constructed. FIG. 4 is a flow chart of a method implementing the operation 302 in FIG. 3 in accordance with some embodiments. In operation 402, different netlists of the pre-driver driving the cell configured in the different circuit topologies are received. In operation 404, the different input waveforms with the input transition characteristic are constructed using the different circuits of the pre-driver driving the cell.

In operation 402 of FIG. 4, different netlists of the pre-driver driving the cell using the different circuit topologies are received. FIG. 5 includes schematic circuit diagrams of the different netlists 500, 520, and 540 of the pre-driver driving the cell configured in the different circuit topologies in accordance with some embodiments. The different netlists are the netlist 500 for an average circuit topology, the netlist 520 for a high resistance (R) circuit topology and the netlist 540 for a high fanout (FO) circuit topology. The netlist 500 for the average circuit topology includes the pre-driver 502, a FO 508 of the pre-driver 502 and an interconnect 506 between the pre-driver 502 and the FO 508 of the pre-driver. A cell 504 in the FO 508 is the cell to be characterized using an input waveform, a transition of a voltage $V_{in}$ at an input of the cell 504. In some embodiments, an interconnect segment is modeled by a resistor with a resistance R and two capacitors each with a capacitance C. Each of the capacitors is coupled between a respective end of the resistor and the ground. The number of interconnect segments included in an interconnect is determined by, for example, a length of the interconnect. In the illustrative example of the average circuit topology in the netlist 500, the interconnect 506 includes one interconnect segment and has an average R. In addition, in the example for the average circuit topology, the FO 508 is an average FO of 3. The netlist 520 for the high R circuit topology and the netlist 540 for the high FO circuit topology are similar to the netlist 500 for the average circuit topology except a difference in the interconnect resistance, and a difference in the FO, respectively. In the netlist 520 for the high R circuit topology, an interconnect 526 coupling the FO 508 to the pre-driver 502 includes, for example, 10 interconnect segments. Therefore, the resistance of the interconnect 526 is 10 R. In the netlist 540 for the high FO circuit topology, a FO 548 of the pre-driver 502 includes, for example, 60 cells. Hence, the FO 548 is 20 times the FO 508.

Figure 6:
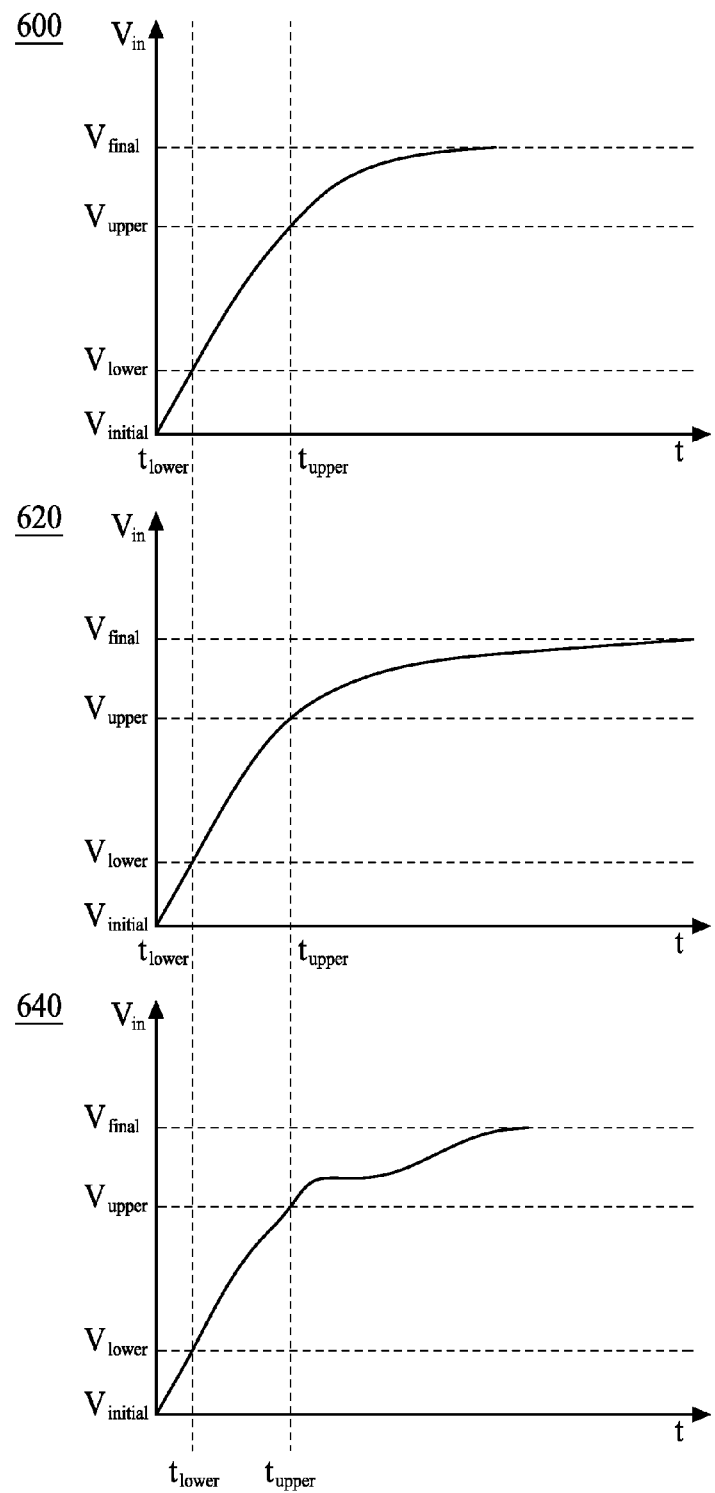
FIG. 6 includes schematic waveform diagrams of the different input waveforms which have the same input transition characteristic and are constructed using the different netlists of the pre-driver driving the cell, respectively, in accordance with some embodiments.

In operation 404 in FIG. 4, the different input waveforms with the input transition characteristic are constructed using the different netlists 500, 520 and 540 of the pre-driver 502 driving the cell 504 as exemplarily shown in FIG. 5. FIG. 6 includes schematic waveform diagrams of the different input waveforms 600, 620 and 640 which have the same input transition characteristic and are constructed using the different netlists 500, 520 and 540 of the pre-driver driving the cell 504, respectively, in accordance with some embodiments. The different input waveforms are the input waveform 600 for the average circuit topology in the netlist 500, the input waveform 620 for the high R circuit topology in the netlist 520, and the input waveform 640 for the high FO circuit topology in the netlist 540. Each of the input waveforms 600, 620 and 640, is a rising transition of the voltage $V_{in}$ with respect to time t at an input of the cell 504 in the corresponding netlist 500, 520 or 540. In some embodiments, for each of the input waveforms 600, 620 and 640, the rising transition of the voltage $V_{in}$ reaches a voltage $V_{lower}$ equal to 30% of a difference between a steady state voltage $V_{final}$ and an initial voltage $V_{initial}$ at time point $t_{lower}$, and reaches a voltage $V_{upper}$ equal to 70% of the difference between the steady state voltage $V_{final}$ and the initial voltage $V_{initial}$ at time point $t_{upper}$. The input waveforms 600, 620 and 640 have corresponding time point $t_{lower}$ and time point $t_{upper}$. Therefore, the input waveforms 600, 620 and 640 have the same input transition characteristic, which, in some embodiments, is an input transition time equal to $t_{upper}-t_{lower}$. In some embodiments, the input transition time of each input waveform 600, 620 or 640 generated using the corresponding netlist 500, 520 or 540 is made equal to each other by adjusting the capacitance of the corresponding interconnect 506, 526 or 506. However, each input waveform 600, 620 or 640 has a different tail portion during which the voltage $V_{in}$ rises from the voltage $V_{upper}$ to the steady state voltage $V_{final}$. The input waveform 620 for the high R circuit topology has a longer tail portion compared to the input waveform 600 for the average circuit topology. The input waveform 640 for the high FO circuit topology also has a longer tail portion compared to the input waveform 600 for the average circuit topology. Further, the tail portion of the input waveform 640 has a kink due to Miller capacitance coupled between the input and outputs of the cells in the FO 548. In the example illustrated in FIG. 6, only rising input waveforms 600, 620 and 640 are shown. However, a falling input waveform can be shown to similarly have an input transition time between time points $t_{upper}$ and $t_{lower}$ when the falling input waveform reaching a voltage $V_{upper}$ and a voltage $V_{lower}$, respectively, and have a tail portion from the voltage $V_{lower}$ to a steady state voltage $V_{final}$.

Although the input waveforms 600, 620 and 640 have the same input transition characteristic, the different tail portions of the input waveforms 600, 620 and 640 cause different output responses of the cell 504 which have substantially different delays with respect to their corresponding input waveforms 600, 620 and 640. If, when characterizing a timing model of the cell 504 in the timing library, only one of the different input waveforms 600, 620 and 640 such as the input waveform 600 for the average circuit topology is considered with respect to the input transition characteristic, then the different tail portions of the input waveforms 600, 620, and 640 are ignored. If, in the physical netlist obtained from the parasitic extraction stage 160 in FIG. 1, the cell 504 is configured in a high R or high FO circuit topology, then an actual propagated input waveform to the cell 504 has a tail portion different from that of the input waveform 600 used to characterize the timing model of the cell 504. The generated output response of the cell 504 using the characterized timing model thereby has a delay substantially different from that of the actual output response generated by a timing model characterized using the actual propagated input waveform. Hence, in order to take a tail portion of the propagated input waveform into consideration, in some embodiments described with reference to FIGS. 11 and 13, the different input waveforms 600, 620 and 640 constructed in operation 404 are utilized to characterize different timing models of the cell 504 or a timing model of the cell 504 with sensitivities for correcting an output response generated using the timing model.

Figure 7:
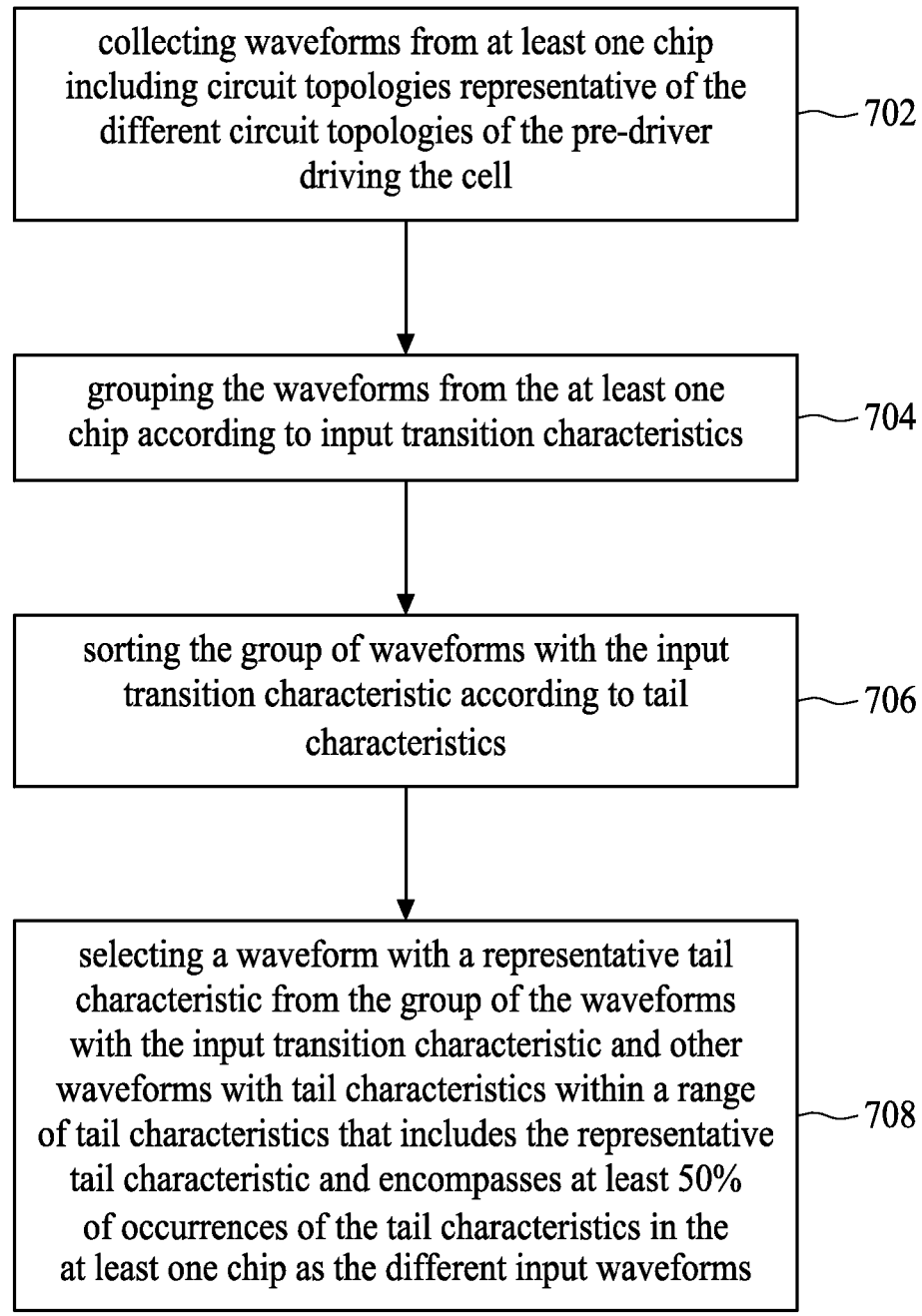
FIG. 7 is a flow chart of another method implementing the operations 302 in FIG. 3 in accordance with some embodiments.

FIG. 7 is a flow chart of another method implementing the operations 302 in FIG. 3 in accordance with some embodiments. Compared to the method described with reference to FIG. 4 that produces the input waveforms using the different netlists with the different circuit topologies, the method in FIG. 7 collect waveforms from at least a chip and select input waveforms from the collected waveforms. In operation 702, waveforms from at least one chip including circuit topologies representative of the different circuit topologies driving the cell are collected. In operation 704, the waveforms from the at least one chip are grouped according to input transition characteristics. In operation 706, the group of the waveforms with the input transition characteristic is sorted according to tail characteristics. In operation 708, a waveform with a representative tail characteristic is selected from the group of waveforms with the input transition characteristic, and other waveforms with tail characteristics within a range of tail characteristics that includes the representative tail characteristics and encompasses at least 50% of occurrences of the tail characteristics in the at least one chip are selected as the different input waveforms. In some embodiments, the operations 702, 704 and 706 are not repetitively performed each time as the method 300 in FIG. 3 loops back to perform the operation 302 for a different input transition characteristic. That is, the operations 702, 704 and 706 are performed prior to the operation 302 which includes the selecting operation 708, and each time the method 300 loops back to the operation 302, the selecting operation 708 is performed for a different input transition characteristic.

Figure 8:
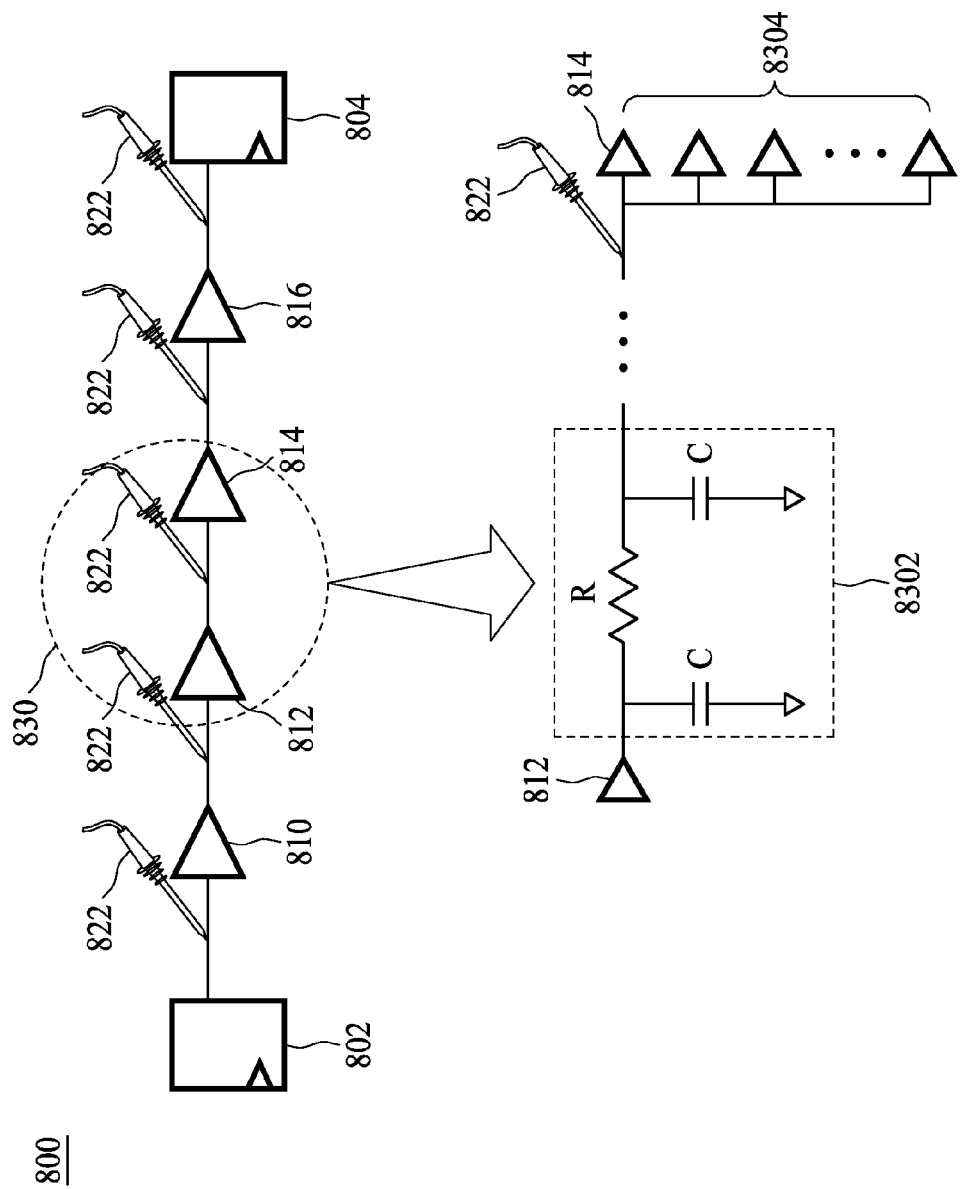
FIG. 8 is a schematic diagram illustrating waveform collection performed at an exemplary timing path in a chip in accordance with some embodiments.

In operation 702 in FIG. 7, waveforms from at least one chip including circuit topologies representative of the different circuit topologies driving the cell are collected. The term "the chip" used herein refers to the chip design obtained from, for example, the physical verification and electrical signoff stage 162 in FIG. 1. In some embodiments, the chip is in the form of a physical netlist and waveforms at circuit nodes in the physical netlist can be generated and probed using, for example, SPICE. Typically, the chip includes many timing paths. FIG. 8 is a schematic diagram illustrating waveform collection performed at an exemplary timing path 800 in the chip in accordance with some embodiments. The timing path 800 starts from a lunch register 802 sending data to a combinational logic circuit exemplarily shown as interconnected cells 810, 812, 814 and 816 and ends at a capture register 804 capturing data from the combinational logic circuit. In some embodiments, waveforms are collected at circuit nodes between the register 802 and the cell 810, the cells 810 and 812, 812 and 814, and 814 and 816, and the cell 816 and the register 804 by, for example, a voltage probe 822 provided by SPICE. A portion 830 of the combinational logic circuit is shown in more details. In the portion 830, the cell 812 and the cell 814 are coupled by an interconnect 8302. A FO 8304 of the cell 812 includes the cell 814 and other cells. The voltage probe 822 is coupled to a circuit node between the interconnect 8302 and the cell 814.

In some embodiments, the waveforms are collected from the timing paths that are critical. For data propagation in the timing path 800 to be successful, a timing slack between a clock period and a time for the lunch register 802 to output data in view of a clock edge, the combinational logic circuit to generate data in view of the data output from the lunch register 802, and the capture register 804 to capture data from the combinational logic circuit needs to be positive. The clock period may be reduced by clock skew. The smaller the timing slack is, the more critical the timing path is. It is more likely that the critical timing path includes one or more cells such as the cells 812 and 814 configured in high resistance and/or high fanout circuit topologies that manifest themselves as delay of the combinational logic circuit. Therefore, waveforms collected from the critical timing paths are more representative of waveforms generated from circuit topologies with diverse values of R and FO, such as the waveforms 600, 620 and 640 illustratively shown in FIG. 6.

Figure 9:
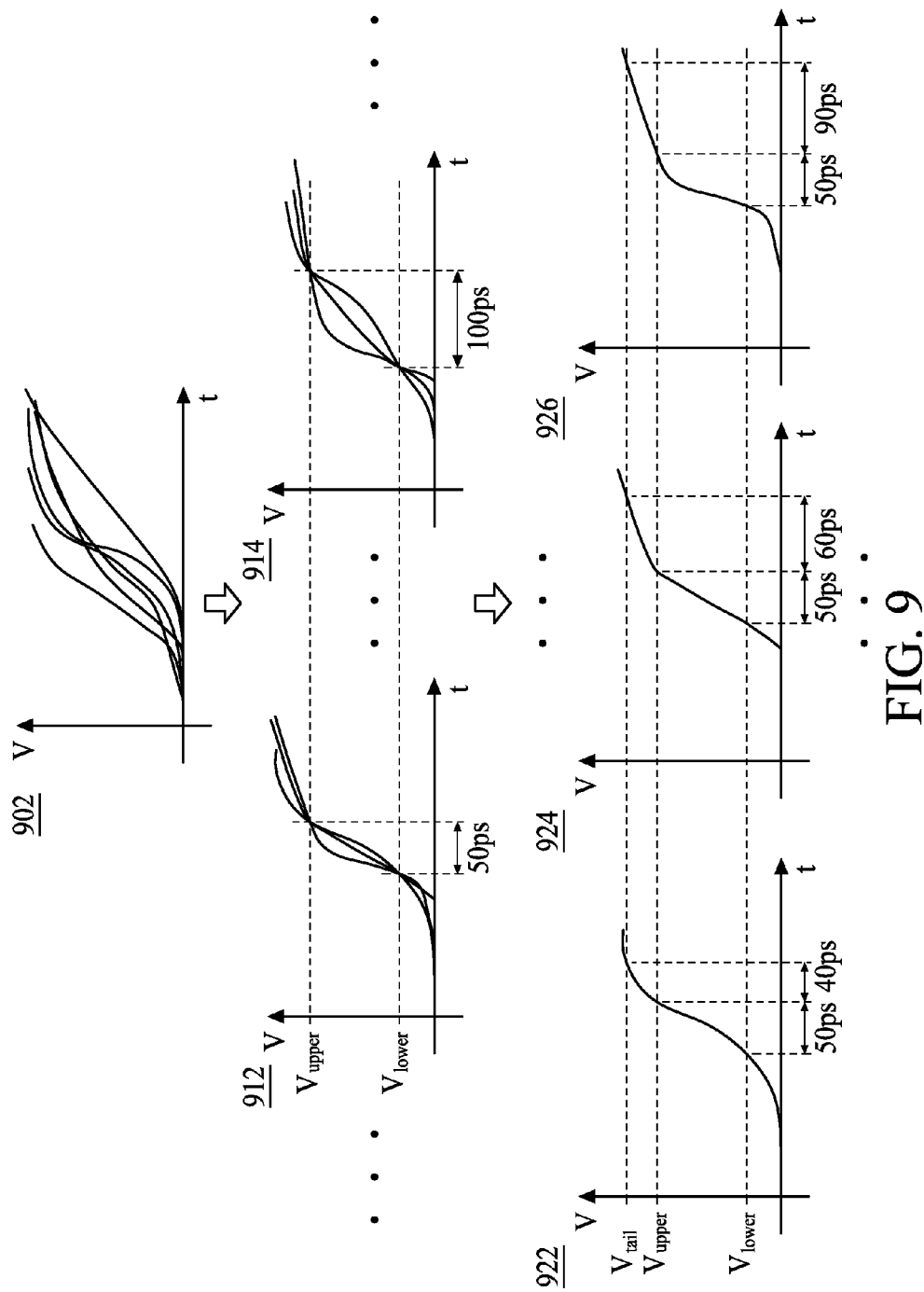
FIG. 9 schematically illustrates waveform diagrams of waveforms obtained from operations in FIG. 7 in accordance with some embodiments.

FIG. 9 schematically illustrates waveform diagrams of waveforms obtained from operations 702, 704 and 706 in FIG. 7 in accordance with some embodiments. A waveform diagram 902 illustrates waveforms collected in operation 702 which is described in detail with reference to FIG. 8. In operation 704 in FIG. 7, the waveforms from the at least one chip are grouped according to input transition characteristics. Waveform diagrams 912 and 914 illustrate groups of waveforms grouped according to input transition characteristics. For example, the group of waveforms in the waveform diagram 912 has an input transition time from the voltage $V_{lower}$ to the voltage $V_{upper}$ of 50 ps. The group of waveforms in the waveform diagram 914 has an input transition time of 100 ps.

In operation 706 in FIG. 7, the group of the waveforms with the input transition characteristic is sorted according to tail characteristics. Waveform diagrams 922, 924 and 926 illustrate the group of waveforms with the input transition characteristic of 50 ps sorted according to tail characteristics. In some embodiments, the tail characteristic is a tail transition time of a waveform transitioning from a level at 70% of the difference between the steady state voltage $V_{final}$ and the initial voltage $V_{initial}$ to a level at 90% of the difference. The steady state voltage $V_{final}$ and the initial voltage $V_{initial}$ have been described with reference to FIG. 6. For a rising transition, such as the waveform in the waveform diagram 922, the levels at 70% and 90% of the difference between the steady state voltage $V_{final}$ and the initial voltage $V_{initial}$ are the voltage $V_{upper}$ and a voltage $V_{tail}$, respectively. In some embodiments, the group of waveforms having the input transition characteristic of 50 ps is sorted in, for example, ascending order, as illustrated by the waveforms with the tail characteristics of 40 ps, 60 ps and 90 ps in the waveform diagrams 922, 924 and 926, respectively.

In operation 708, a waveform with a representative tail characteristic is selected from the group of waveforms with the input transition characteristic. In some embodiments, the median tail characteristic is selected as the representative tail characteristic. Further, in operation 708, other waveforms with tail characteristics within a range of tail characteristics that includes the representative tail characteristics and encompasses at least 50% of occurrences of the tail characteristics in the at least one chip are also selected as the input waveforms. The group of the waveforms with the input transition characteristic of 50 ps contains three exemplary waveforms. In other examples, there are more waveforms present in a group, and a distribution of tail characteristics of the waveforms in the group can be obtained. Other than the median tail characteristic which is the 50$^{th}$ percentile of the distribution, percentiles such as the 25$^{th}$ percentile and the 75$^{th}$ percentile of the distribution are also selected. The range of tail characteristics bounded by the 25$^{th}$ percentile and the 75$^{th}$ percentile encompass at least 50% of the population in the distribution.

Figure 10:
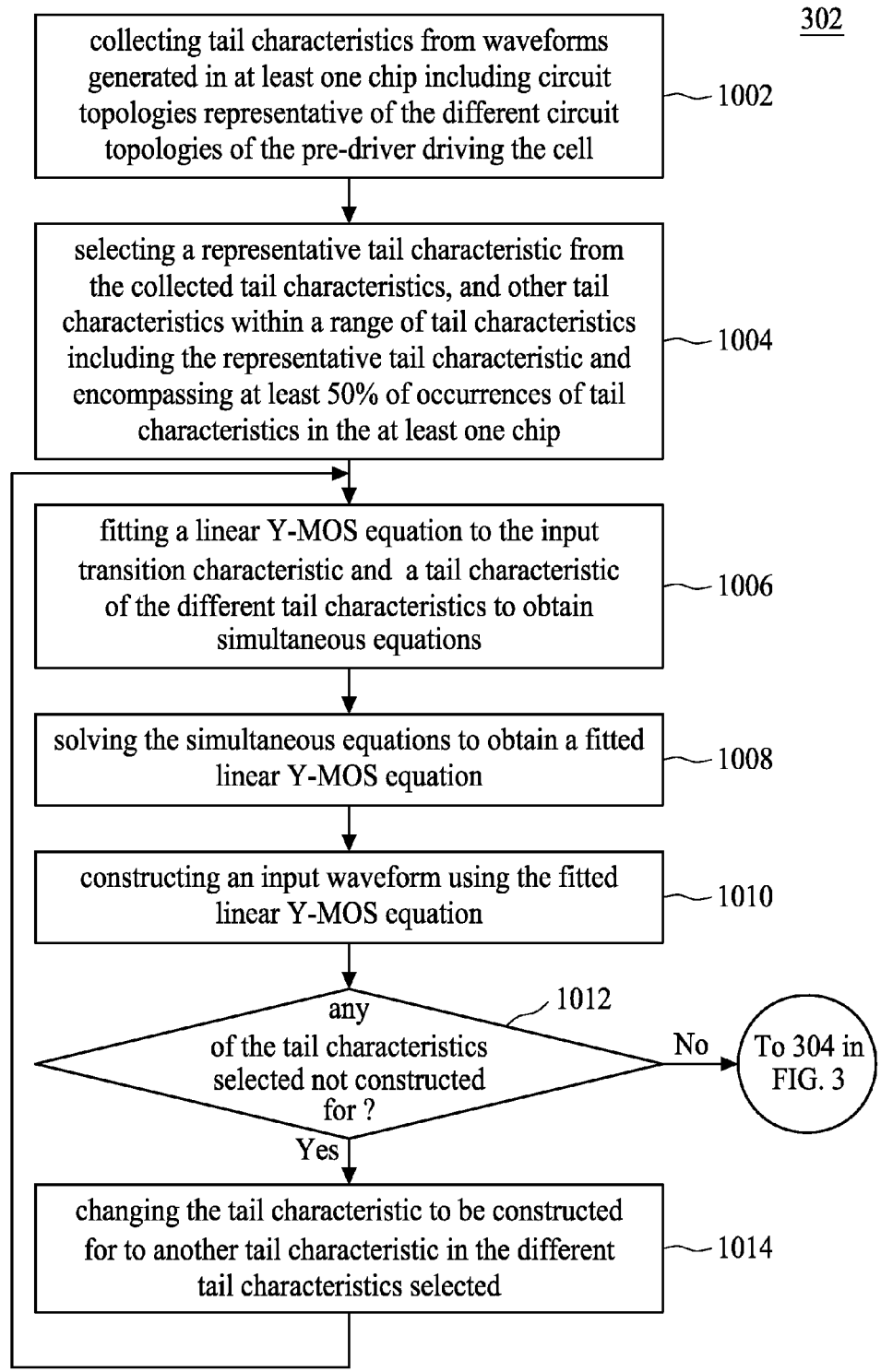
FIG. 10 is a flow chart of another method implementing the operation 302 in FIG. 3 in accordance with some embodiments.

FIG. 10 is a flow chart of another method implementing the operation 302 in FIG. 3 in accordance with some embodiments. Compared to the method described with reference to FIG. 7 that selects input waveforms with diverse tail characteristics from waveforms collected from at least a chip, the method in FIG. 10 constructs input waveforms by fitting linear Y-MOS equations to diverse tail characteristics collected from at least a chip. In operation 1002, tail characteristics are collected from waveforms generated in at least one chip including circuit topologies representative of the different circuit topologies of the pre-driver driving the cell. In operation 1004, a representative tail characteristic is selected from the collected tail characteristics, and other tail characteristics within a range of tail characteristics including the representative tail characteristic and encompassing at least 50% of occurrences of tail characteristics in the at least one chip are also selected. In operation 1006, a linear Y-MOS equation is fitted to the input transition characteristic and a tail characteristic of the different tail characteristics to obtain simultaneous equations. In operation 1008, the simultaneous equations are solved to obtain a fitted linear-Y-MOS equation. In operation 1010, an input waveform is constructed using the fitted linear-Y-MOS equation. In operation 1012, whether any of the tail characteristics selected has not been constructed for is checked. If so, in operation 1014, the tail characteristic to be constructed for is changed to another tail characteristic in the tail characteristics selected, and the method loops back to operation 1006 to construct an input waveform with the tail characteristic. If not, the different input waveforms are constructed and the method of operation 302 in FIG. 10 proceeds to operation 304 in FIG. 3.

Figure 11:
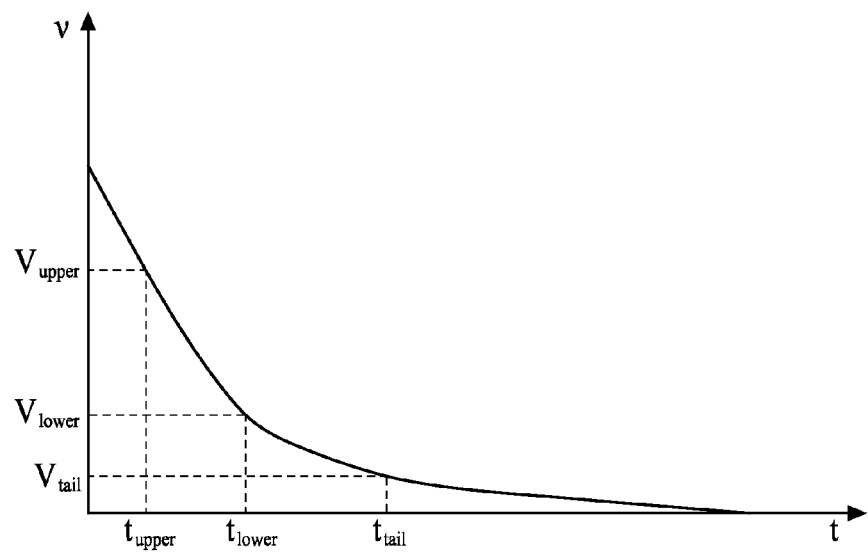
FIG. 11 is a schematic waveform diagram of an exemplary input waveform for illustrating a tail ratio.

In operation 1002, tail characteristics are collected from waveforms generated in at least one chip including circuit topologies representative of the different circuit topologies of the pre-driver driving the cell. In some embodiments, the tail characteristic is a tail ratio. FIG. 11 is a schematic waveform diagram of an exemplary input waveform 1100 for illustrating a tail ratio. The input waveform 1100 is a falling transition of a voltage v with respect to time t at an input of the cell to be characterized for. Suppose the voltage v is normalized with respect to a range of transition of the input waveform 1100, and has a range of [0, 1]. In some embodiments, the falling transition of the voltage v reaches a voltage $V_{upper}$ equal to 0.7, i.e. 30% of the range of transition of the input waveform 1100, at time point $t_{upper}$; reaches a voltage $V_{lower}$ equal to 0.3, i.e. 70% of the range of transition of the input waveform 1100, at time point $t_{lower}$; and reaches a voltage $V_{tail}$ equal to 0.1, i.e. 90% of the range of transition of the input waveform 1100, at time point $t_{tail}$. A tail ratio is obtained by considering an input transition characteristic obtained based on a portion of the input waveform 1100 between the voltages $V_{upper}$ and $V_{lower}$, and a supplemental input transition characteristic obtained based on a portion of the input waveform 1100 between the voltages $V_{lower}$ and $V_{tail}$. In some embodiments, the tail ratio of the falling input waveform 800 is calculated by the following formula:

$$\text{tail ratio}_{falling} = \frac{t_{tail} - t_{lower}}{t_{lower} - t_{upper}} \quad (1)$$

where $t_{lower} - t_{upper}$ is the input transition characteristic, and $t_{tail} - t_{lower}$ is the supplemental input transition characteristic.

In FIG. 11, the input waveform 1100 is a falling input waveform. In the case of a rising input waveform, the voltage v reaches a voltage $V_{lower}$ equal to 0.3, i.e. 30% of the range of transition of the rising input waveform, first at time point $t_{lower}$; reaches a voltage $V_{upper}$ equal to 0.7, i.e. 70% of the range of transition of the rising input waveform, next at time point $t_{upper}$; and then reaches a voltage $V_{tail}$ equal to 0.9, i.e. 90% of the range of transition of the rising input waveform, at time point $t_{tail}$. Therefore, a formula for calculating the tail ratio for a rising input waveform has the following form:

$$\text{tail ratio}_{rising} = \frac{t_{tail} - t_{upper}}{t_{upper} - t_{lower}} \quad (2)$$

where $t_{upper} - t_{lower}$ is the input transition characteristic, and $t_{lower} - t_{tail}$ is the supplemental input transition characteristic.

As described with reference to FIGS. 5 and 6, input waveforms generated by a pre-driver driving the cell configured in different circuit topologies, respectively, can have the same input transition characteristic but different tail portions. By considering the tail ratio of the input waveform 1100, another input waveform with the same input transition characteristic but with a different supplemental input transition characteristic due to a different tail portion can be discerned from the input waveform 1100. Therefore, the different tail ratios received can be used to construct input waveforms that have the same input transition characteristic but have different tail portions. In the following, a method for selecting tail ratios representing different circuit topologies is described.

Figure 12:
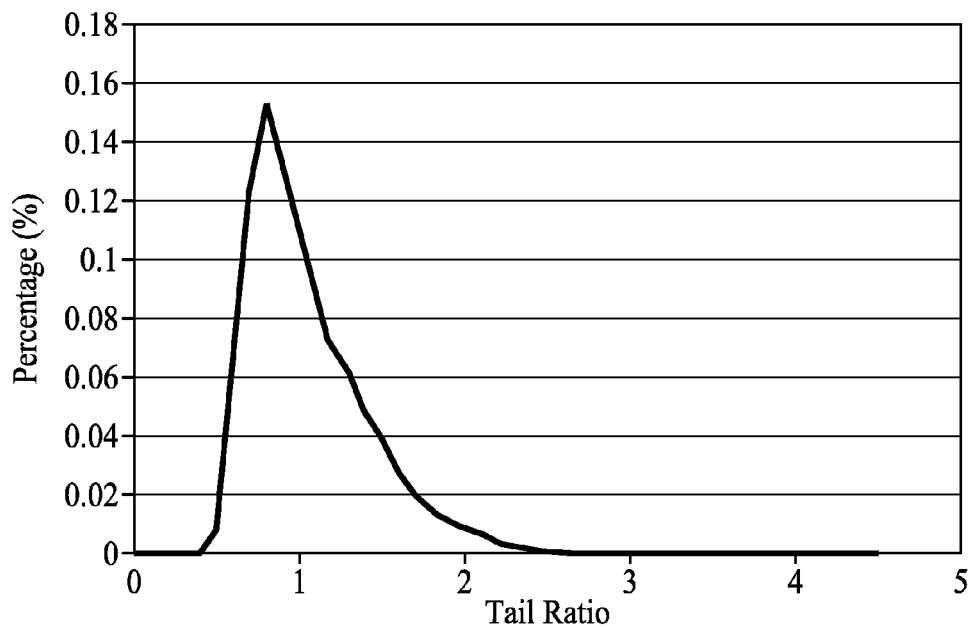
FIG. 12 is a schematic probability density function of a tail ratio distribution of input waveforms to cells in a chip in accordance with some embodiments.

FIG. 12 is a schematic probability density function (pdf) of a tail ratio distribution of waveforms collected in the chip in accordance with some embodiments. Similar to embodiments described with reference to FIGS. 7 and 8, waveforms are collected from many timing paths in the chip. These timing path traverse cells that are configured in circuit topologies with wide ranges of interconnect resistance and fanout. Therefore, the collected waveforms have diverse tail ratios. The tail ratios of the collected waveforms form a tail ratio distribution. The tail ratio distribution is then converted into a pdf that reflects probabilities of the occurrences different tail ratios in the tail ratio distribution, respectively. In operation 1004, a representative tail characteristic is selected from the collected tail characteristics, and other tail characteristics within a range of tail characteristics including the representative tail characteristic and encompassing at least 50% of occurrences of tail characteristics in the at least one chip are also selected. In some embodiments, the representative tail characteristic and other tail characteristics in operation 1004 are selected from the pdf. For example, the median tail ratio, and the $1^{st}$ percentile tail ratio and the $99^{th}$ percentile tail ratio are selected to cover the representative tail ratio as well as the more extreme tail ratios collected from the chip. Selections at other percentiles on the pdf or other methods for selecting tail ratios are within the contemplated scope of the present disclosure.

Figure 13:
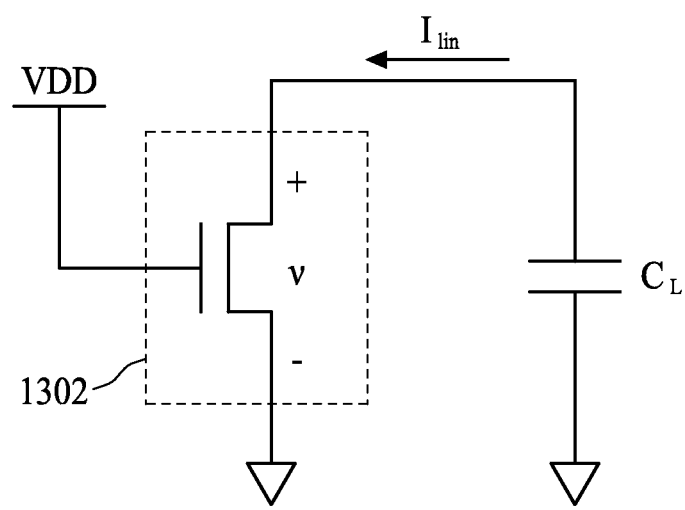
FIG. 13 is a schematic circuit diagram of a circuit for deriving a linear Y-MOS equation in accordance with some embodiments.

In operation 1006, a linear Y-MOS equation is fitted to the input transition characteristic and a tail characteristic of the different tail characteristics to obtain simultaneous equations. FIG. 13 is a schematic circuit diagram of a circuit 1300 for deriving the linear Y-MOS equation in accordance with some embodiments. The circuit 1300 includes an NMOS 1302 and a lumped capacitor $C_L$. A source of the NMOS 1302 and one terminal of the lumped capacitor $C_L$ are grounded, a drain of the NMOS 1302 and the other terminal of the lumped capacitor $C_L$ are coupled together, and a gate of the NMOS 1302 is coupled to a power supply VDD. A differential equation is obtained with respect to the circuit 1300 in a state of discharging the lumped capacitor $C_L$ by the NMOS operating at the linear region with the gate of the NMOS 1002 fully turned on, and is shown in the following:

$$I_{lin} = a \cdot v + b \cdot v^2 = -\frac{dv}{dt} \quad (3)$$

where $I_{lin}$ is a discharging current from the lumped capacitor $C_L$ through the NMOS 1302; v is the drain to source voltage of the NMOS 1302; a and b are coefficients of the first-order and second-order terms in the differential equation, respectively; and t is time. The linear Y-MOS equation can be derived from the differential equation (3), and is shown in the following:

$$t = -\frac{1}{a} \cdot \log\left(\frac{(a+b) \cdot v}{a+b \cdot v}\right) \quad (4)$$

To fit the linear Y-MOS equation (4) to the input transition characteristic and the tail ratio, three points ($V_{upper}$, $t_{upper}$), ($V_{lower}$, $t_{lower}$) and ($V_{tail}$, $t_{tail}$) are identified on, for example, a falling input waveform. Then, the points corresponding to the input transition characteristic, $t_{lower}$–$t_{upper}$, are used to establish one of the simultaneous equations, and the points corresponding to the tail ratio, $$\frac{t_{tail} - t_{lower}}{t_{lower} - t_{upper}},$$

are used to establish the other of the simultaneous equations. Therefore, two equations with two unknowns a and b are obtained.

In operation 1008, the simultaneous equations are solved to obtain a fitted linear Y-MOS equation. By solving the simultaneous equations, the two unknowns a and b are solved. The linear Y-MOS equation with the resolved a and b is the linear Y-MOS equation fitted to the input transition characteristic and the tail ratio.

In operation 1010, the fitted linear Y-MOS equation is used to construct an input waveform with the input transition characteristic and the tail ratio. For example, voltages at different time points can now be obtained from the fitted linear Y-MOS equation, and an input waveform can be constructed using the voltages at the different time points.

Then, the method for operation 302 in FIG. 10 loops back to perform fitting the linear Y-MOS equation with respect to a different tail characteristic and constructing an input waveform with the input transition characteristic and the different tail characteristic until each of the different tail characteristics selected in operation 1004 is fitted with respect to. Then the method for operation 302 proceeds to operation 304 in FIG. 3.

Figure 14:
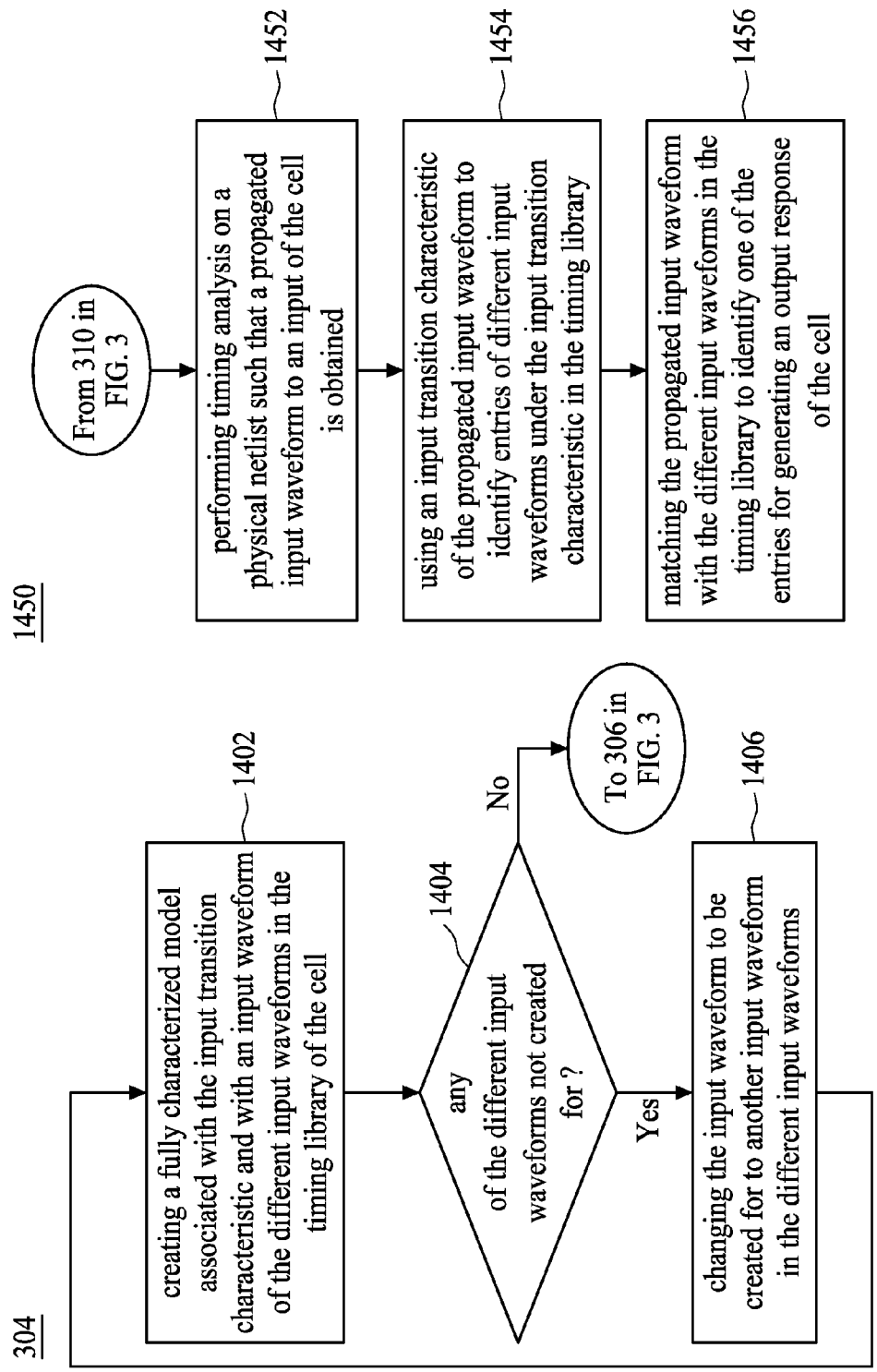
FIG. 14 are flow charts of a method implementing the operation 304 in FIG. 3, and a corresponding method for performing waveform propagation during performing timing analysis on a physical netlist in accordance with some embodiments.

In operation 304 in FIG. 3, the cell is characterized using the different input waveforms to create entries associated with the input transition characteristic and the different circuit topologies in a timing library. FIG. 14 are flow charts of a method implementing the operation 304 in FIG. 3, and a corresponding method 1450 for performing waveform propagation during performing timing analysis on a physical netlist in accordance with some embodiments. In operation 1402, a fully characterized model associated with the input transition characteristic and with an input waveform of the different input waveforms constructed is created in the timing library of the cell. In operation 1404, whether any of the different input waveforms for which a fully characterized model is not created is checked. If so, the method continues to operation 1406 to change the input waveform to be created for to another input waveform in the different input waveforms and loops back to operation 1402. If not, the method of operation 304 in FIG. 14 proceeds to operation 306 in FIG. 3 which checks if another input transition characteristic is to be characterized for.

After the timing library of the cell is created at the connecting point 310, the method 1450 is performed using the timing library. In some embodiments the method 1450 is performed at the physical verification and electrical signoff stage 162 in FIG. 1. In some embodiments, the method 1450 is performed by the timing analysis tool 25 in FIG. 2. In operation 1452, timing analysis is performed on the physical netlist such that a propagated input waveform to an input of the cell is obtained. In operation 1454, an input transition characteristic of the propagated input waveform is used to identify entries of different input waveforms under the input transition characteristic in the timing library. In operation 1456, the propagated input waveform is matched with the different input waveforms in the timing library to identify one of the entries for generating an output response of the cell.

In operation 1402, a fully characterized model associated with the input transition characteristic and with an input waveform of the different input waveforms constructed is created in the timing library of the cell. A fully characterized model is a timing model for generating an output response of the cell characterized using the input waveform and is used independent of other entries the library characterized using other input waveforms. In some embodiments, the timing model is a current source model. FIG. 15 is a schematic diagram for a timing library 1500 of the cell in accordance with some embodiments. In some embodiments, by performing the operation 1402, a fully characterized model is created with respect to the input transition characteristic, such as the $1^{st}$ input transition characteristic, and to the input waveform, such as a waveform of an average circuit topology, in the timing library 1500.

Through operations 1404 and 1406, the method of operation 304 continues to loop back to operation 1402 to create fully characterized models for other input waveforms, such as a waveform for a high R circuit topology and a waveform for a high FO circuit topology under the $1^{st}$ input transition characteristic in the timing library 1500. Then, characterization with respect to the $1^{st}$ input transition characteristic is completed. As described with reference to FIGS. 7 and 10, the different input waveforms used for fully characterizing models can also be input waveforms with different tail characteristics.

Then, the method of operation 304 in FIG. 14 proceeds to operation 306 in FIG. 3. For characterizing with respect to the $2^{nd}$ input transition characteristic in the timing library 1500, the method 300 loops back to operation 302 to obtain different input waveforms with the $2^{nd}$ input transition characteristic, such as constructing different input waveforms for the average circuit topology, high R circuit topology and high FO circuit topology with the $2^{nd}$ input transition characteristic. Then, the method 300 continues to operation 1402 to create fully characterized models for the different input waveforms with the $2^{nd}$ input transition characteristic. The process repeats for another input transition characteristic until each of the input transition characteristic to be characterized for in the timing library are processed. After the timing library 1500 of the cell is created, a model can be looked up using an input transition characteristic and an input waveform as the keys.

In operation 1452, timing analysis is performed on a physical netlist such that a propagated input waveform to an input of the cell is obtained. In order to perform timing analysis on the physical netlist, the physical netlist is formulated into a timing graph. Through traversing the timing graph node by node, a propagated input waveform received at an input of a node is propagated to an output of the node as a propagated input waveform to an input of the next node. Suppose the node with the cell which has been characterized using the methods described with reference to FIGS. 3 to 13 is the current node for waveform propagation. In the process of performing timing analysis, the propagated input waveform to the input of the cell of the current node is obtained.

In operation 1454, an input transition characteristic of the propagated input waveform to the cell is used to identify entries of different input waveforms under the input transition characteristic in the timing library. For example, suppose the propagated input waveform has an input transition characteristic corresponding to the $1^{st}$ input transition characteristic in the timing library 1500 in FIG. 15, then the entries under the $1^{st}$ input transition characteristic in the timing library 1500 in FIG. 15 are identified.

In operation 1456, the propagated input waveform is matched to the different input waveforms in the timing library to identify one of the entries for generating an output response of the cell. For example, if the cell is configured in a high R circuit topology when being driven by a pre-driver in the physical netlist, then the propagated input waveform generated is better matched with the waveform for the high R circuit topology in the timing library 1200. As a result, the fully characterized model under the waveform for high R circuit topology is identified for generating the output response of the cell of the current node. The generated output response is then used as a propagated input waveform to an input of a cell of the next node.

In the embodiments described with reference to FIGS. 3 to 15, the cell is fully characterized with respect to the different input waveforms constructed using the different circuit topologies of the pre-driver driving the cell resulting in the same input transition characteristic. By further performing waveform matching to identify the input waveform closer to the propagated input waveform not only in the input transition characteristic but also in another portion, such as the tail portion, of the waveform, distortion in the propagated input waveform with respect to the input waveform used to characterize the cell is reduced. Therefore, the output response of the cell is generated using the model characterized using the input waveform better resembles the distorted propagated input waveform and is more accurate.

Figure 16:
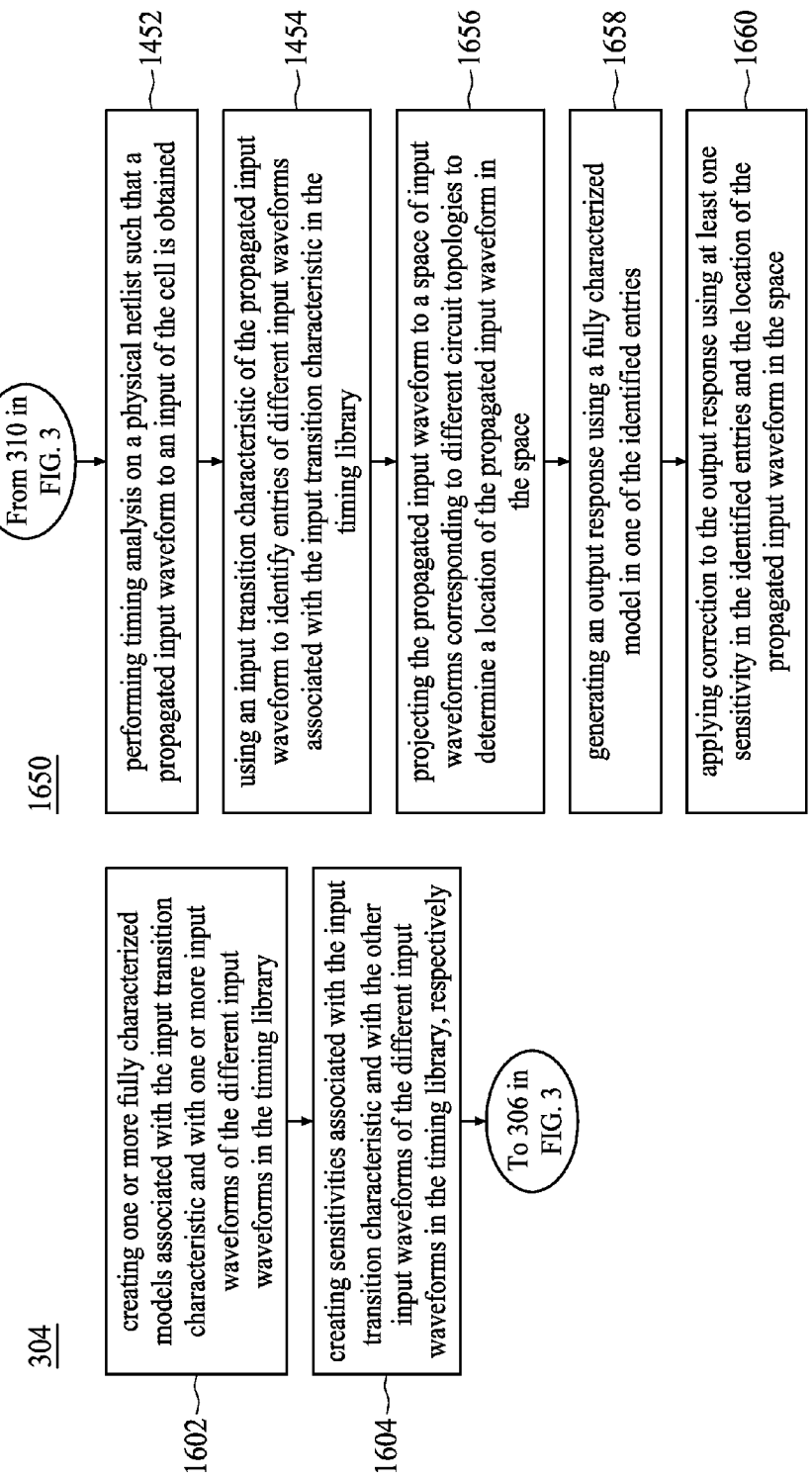
FIG. 16 are flow charts of another method implementing the operation 304 in FIG. 3 and a corresponding method for performing waveform propagation during performing timing analysis on a physical netlist in accordance with some embodiments.

FIG. 16 are flow charts of another method implementing the operation 304 in FIG. 3 and a corresponding method 1650 for performing waveform propagation during performing timing analysis on a physical netlist in accordance with some embodiments. Compared to the methods described with reference to FIG. 14, the methods described with reference to FIG. 16 create a fully characterized model for one of the different input waveforms and create sensitivities for some of the different input waveforms for correcting an output response generated using the fully characterized model. In operation 1602, one or more fully characterized models associated with the input transition characteristic and with one or more input waveforms of the different input waveforms are created in the timing library. In operation 1604, sensitivities associates with the input transition characteristic and with the other input waveforms of the different input waveforms are created in the timing library, respectively. Then, the method of operation 304 in FIG. 16 proceeds to operation 306 in FIG. 3 which checks if another input transition characteristic is to be characterized for.

In some embodiments, after the timing library of the cell is created at the connecting point 310, the method 1650 is performed using the timing library. In some embodiments the method 1650 is performed at the physical verification and electrical signoff stage 162 in FIG. 1. In some embodiments, the method 1650 is performed by the timing analysis tool 25 in FIG. 2. In operation 1452, timing analysis is performed on a physical netlist such that a propagated input waveform to an input of the cell is obtained. In operation 1454, an input transition characteristic of the propagated input waveform is used to identify entries of different input waveforms under the input transition characteristic in the timing library. The operations 1452 and 1454 in the method 1650 are similar to those of the method 1450 in FIG. 14 and details of which are omitted here. In operation 1656, the propagated input waveform is projected to a space of input waveforms corresponding to different circuit topologies to determine a location of the propagated input waveform in the space. In operation 1658, an output response is generated using a fully characterized model in one of the identified entries. In operation 1660, correction to the output response is applied using at least one sensitivity in the identified entries and the location of the propagated input waveform in the space.

In operation 1602 in FIG. 16, one or more fully characterized models associated with the input transition characteristic and with one or more input waveforms of the different input waveforms are created in the timing library. In operation 1604, sensitivities associated with the input transition characteristic and with other input waveforms of the different input waveforms are created, respectively. FIG. 17 is a schematic diagram for a timing library 1700 of the cell in accordance with some embodiments. In some embodiments, in operations 1602 and 1604, for an input transition characteristic, such as the $1^{st}$ input transition characteristic, the different input waveforms for the different circuit topologies, such as the average R and FO circuit topology, the high R and average FO circuit topology, and the average R and high FO circuit topology, are stored in the timing library 1700, and one or more fully characterized models and sensitivities are created under the different input waveforms, respectively. In other embodiments, in operations 1602 and 1604, for an input transition characteristic, such as the $1^{st}$ input transition characteristic, effects of some circuit topology aspects, such as resistance and fanout, on the different input waveforms are evaluated, and evaluated results are stored in the timing library 1700. One or more fully characterized models and sensitivities are created under the evaluated results of the different input waveforms. For simplicity, the fully characterized models and sensitivities will be referred to as being under the corresponding circuit topologies in the timing library 1700 hereafter.

After a propagated input waveform is received at the input of the cell in operation 1452 in FIG. 16, an input transition characteristic of the propagate input waveform is used to identify entries of different input waveforms under the input transition characteristic in the timing library 1700 in operation 1454. In the following, the identified entries are supposed to be under the 1st input transition characteristic in the timing library 1700 as an example.

Figure 18:
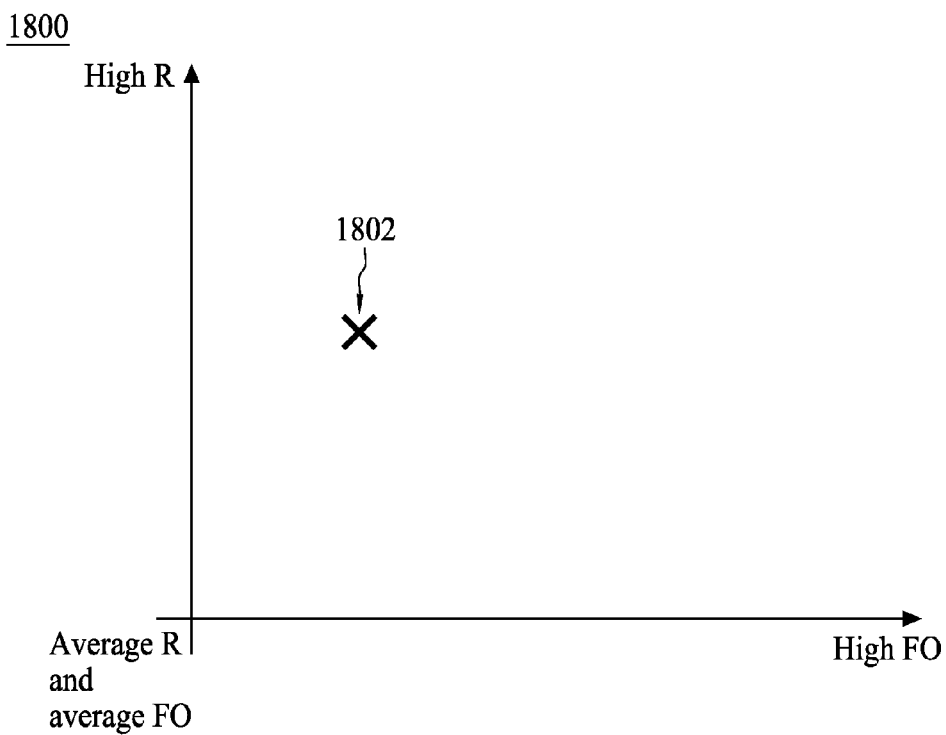
FIG. 18 is a schematic diagram for a space of input waveforms corresponding to different circuit topologies in accordance with some embodiments.

In operation 1656, the propagated input waveform is projected to a space of input waveforms corresponding to different circuit topologies to determine a location of the propagated input waveform in the space. FIG. 18 is a schematic diagram for a space 1800 of input waveforms corresponding to different circuit topologies in accordance with some embodiments. In the space 1800, the input waveform corresponding to the average R and average FO circuit topology is located at the origin, a high FO axis is an axis for an effect of higher FO on the input waveforms, and a high R axis is axis for an effect of higher R on the input waveforms. In the example illustratively shown in FIG. 18, the high FO axis and the high R axis are orthogonal. In other examples (not shown), the axes of the space are not orthogonal and therefore, increase or decrease in the effect of FO is accompanied with increase or decrease in the effect of R. In some embodiments, by performing operation 1656, the propagated input waveform is projected to the space 1800 at a location 1802. The high FO axis component of the location 1802 reflects the effect of higher FO on the propagated input waveform in reference to the input waveform for the average R and average FO, and the high R axis component of the location 1802 reflects the effect of higher R on the propagated input waveform in reference to the input waveform for the average R and average FO.

In operation 1658, an output response is generated using a fully characterized model in one of the identified entries. By performing operation 1658, the output response is generated using the fully characterized model under the average R and average FO circuit topology.

Figure 19:
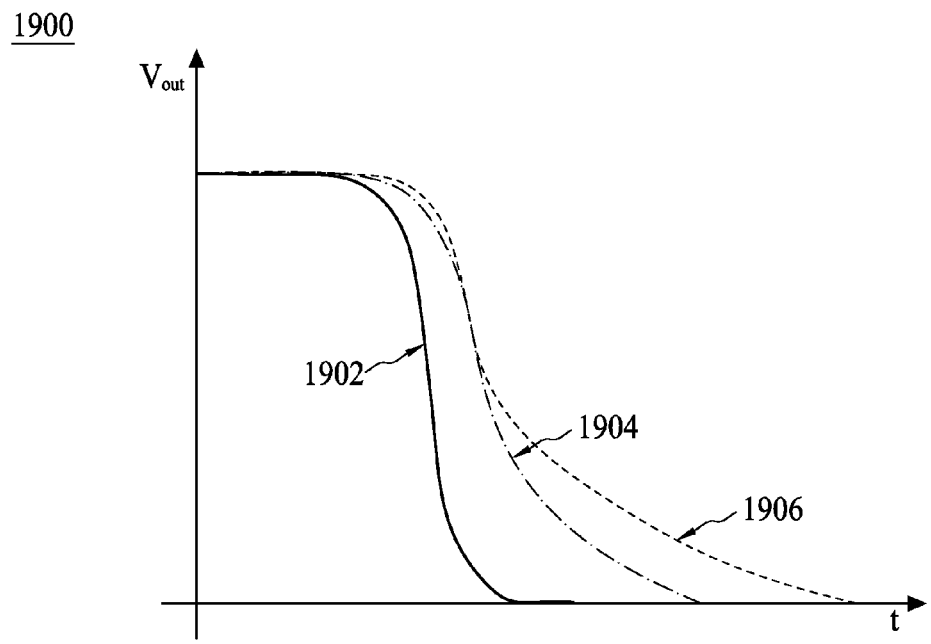
FIG. 19 is a schematic waveform diagram of output responses without sensitivity correction, with high resistance sensitivity correction and further with high fanout sensitivity correction in accordance with some embodiments.

In operation 1660, correction to the output response is applied using at least one sensitivity in the identified entries and the location of the propagated input waveform in the space. FIG. 19 is a schematic waveform diagram of output responses 1902, 1904 and 1904 without sensitivity correction, with high resistance sensitivity correction and further with high fanout sensitivity correction in accordance with some embodiments. In FIG. 19, an output response is a transition of a voltage $V_{out}$ with respect to time t at an output of the cell in response an input waveform to the input of the cell. The output response 1902 is the output response generated using the fully characterized model under the average R and average FO circuit topology in the identified entries in the timing library 1700 in operation 1658. In the identified entries in the timing library 1700, sensitivities for correcting the output response 1902 generated using the fully characterized model for the average R and average FO circuit topology in view of the effects of different R and FO on the propagated input waveform accompany the fully characterized model. By applying correction of higher R to the output response 1902 using the sensitivity of high R and average FO circuit topology and the high R component in the location 1802 of the propagated input waveform in FIG. 18, the output response 1904 corrected with respect to higher R is obtained. Then, by applying correction of higher FO to the output response 1904 using the sensitivity of average R and high FO circuit topology and the high FO component in the location 1802 of the propagated input waveform, the output response 1906 corrected with respect to higher R and higher FO is obtained.

FIG. 20 is a schematic diagram of another timing library 2000 of the cell in accordance with some embodiments. Compared to the embodiments described with reference to FIG. 17, one or more fully characterized models and sensitivities are created under different tail characteristics in the timing library 2000 in FIG. 20, respectively. In operation 1602, for the $1^{st}$ input transition characteristic, two fully characterized models, such as the $1^{st}$ and $2^{nd}$ fully characterized models, are created using input waveforms that exhibit a $2^{nd}$ selected tail ratio and a $5^{th}$ selected tail ratio, respectively, and are stored under the $2^{nd}$ selected tail ratio and the $5^{th}$ selected tail ratio in the timing library 2000. In operation 1604, sensitivities for correcting an output response generated using the $1^{st}$ fully characterized model are created using input waveforms that exhibit a $1^{st}$ selected tail characteristic and a $3^{rd}$ selected tail characteristic, respectively, and are stored under the $1^{st}$ selected tail characteristic and the $3^{rd}$ selected tail characteristic in the timing library 2000. Sensitivities for correcting an output response generated using the $2^{nd}$ fully characterized model are similarly created and stored.

After a propagated input waveform is received at the input of the cell in operation 1452 in FIG. 16, and an input transition characteristic of the propagate input waveform is used to identify entries of different tail ratios under the input transition characteristic in the timing library 2000 in operation 1454. In the following, the identified entries are supposed to be under the $1^{st}$ input transition characteristic in the timing library 2000 as an example.

Figure 21:
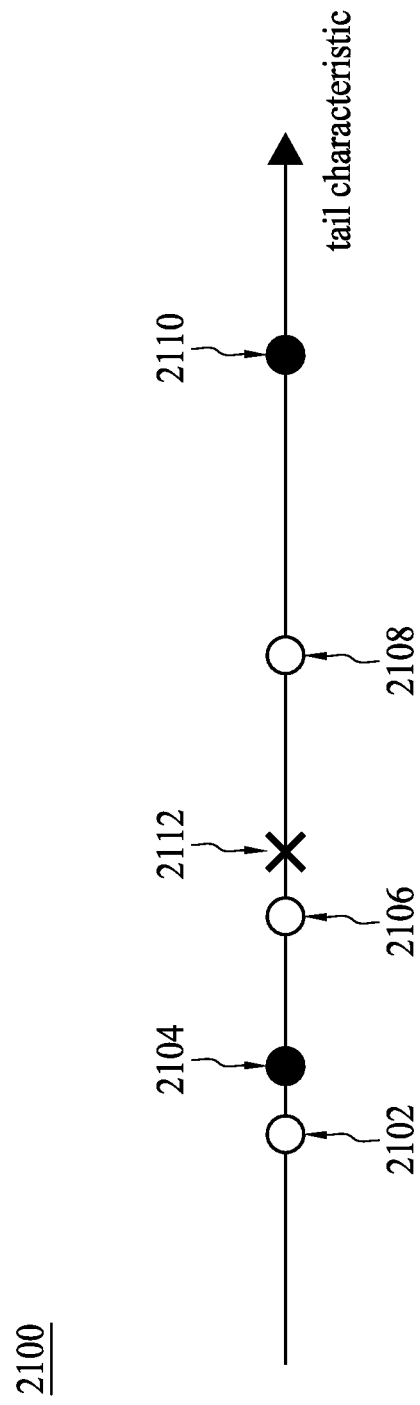
FIG. 21 is a schematic diagram for a space of input waveforms corresponding to different circuit topologies in accordance with some embodiments.

In operation 1656, the propagated input waveform is projected to a space of input waveforms corresponding to different circuit topologies to determine a location of the propagated input waveform in the space. FIG. 21 is a schematic diagram for a space 2100 of input waveforms corresponding to different circuit topologies in accordance with some embodiments. The space 2100 is a line for tail characteristics. In the space 2100, the input waveforms with the $2^{nd}$ selected tail characteristic 2104 and the $5^{th}$ selected tail characteristic 2110 are denoted as solid circles, and the input waveforms with the $1^{st}$ selected tail characteristic 2102, the $3^{rd}$ selected tail characteristic 2106 and the $4^{th}$ selected tail characteristic 2108 are denoted as empty circles. By performing operation 1656, the propagated input waveform is projected to the space 2100 at a location 2112. The propagated input waveform has a tail characteristic closest to the $3^{rd}$ selected tail characteristic 2106 and is slightly over the $3^{rd}$ selected tail characteristic.

In operation 1658, an output response is generated using a fully characterized model in one of the identified entries. Because the location 2112 of the propagated input waveform is closest to the $3^{rd}$ selected tail characteristic 2106, the output response is first generated using the $1^{st}$ fully characterized model under the $2^{nd}$ selected tail characteristic 2104.

In operation 1660, correction to the output response is applied using at least one sensitivity in the identified entries and the location of the propagated input waveform in the space. Because the location 2112 is closest to the $3^{rd}$ selected tail characteristic 2106, the sensitivity corresponding to the $3^{rd}$ selected tail characteristic in the timing library 2000 and the distance between the location 2112 of the propagated input waveform and the $2^{nd}$ selected tail ratio are used for applying correction to the output response generated using $1^{st}$ the fully characterized model.

In the embodiments described with reference to FIGS. 3 to 13 and 16 to 21, the cell is fully characterized with respect to some of the different input waveforms constructed using the different circuit topologies of the pre-driver driving the cell resulting in the same input transition characteristic and is characterized for sensitivities with respect to others of the different input waveforms. By further applying sensitivity correction to the output response, which is generated considering only the input transition characteristic of the propagated input waveform, based on a projected location of the propagated input waveform in the space of the different input waveforms, the effects of distortion in the propagated input waveform with respect to the input waveform used to characterize the cell are considered. Therefore, the output response of the cell is corrected with respect to effects of distortion in the propagated input waveform and is more accurate.

Figure 22:
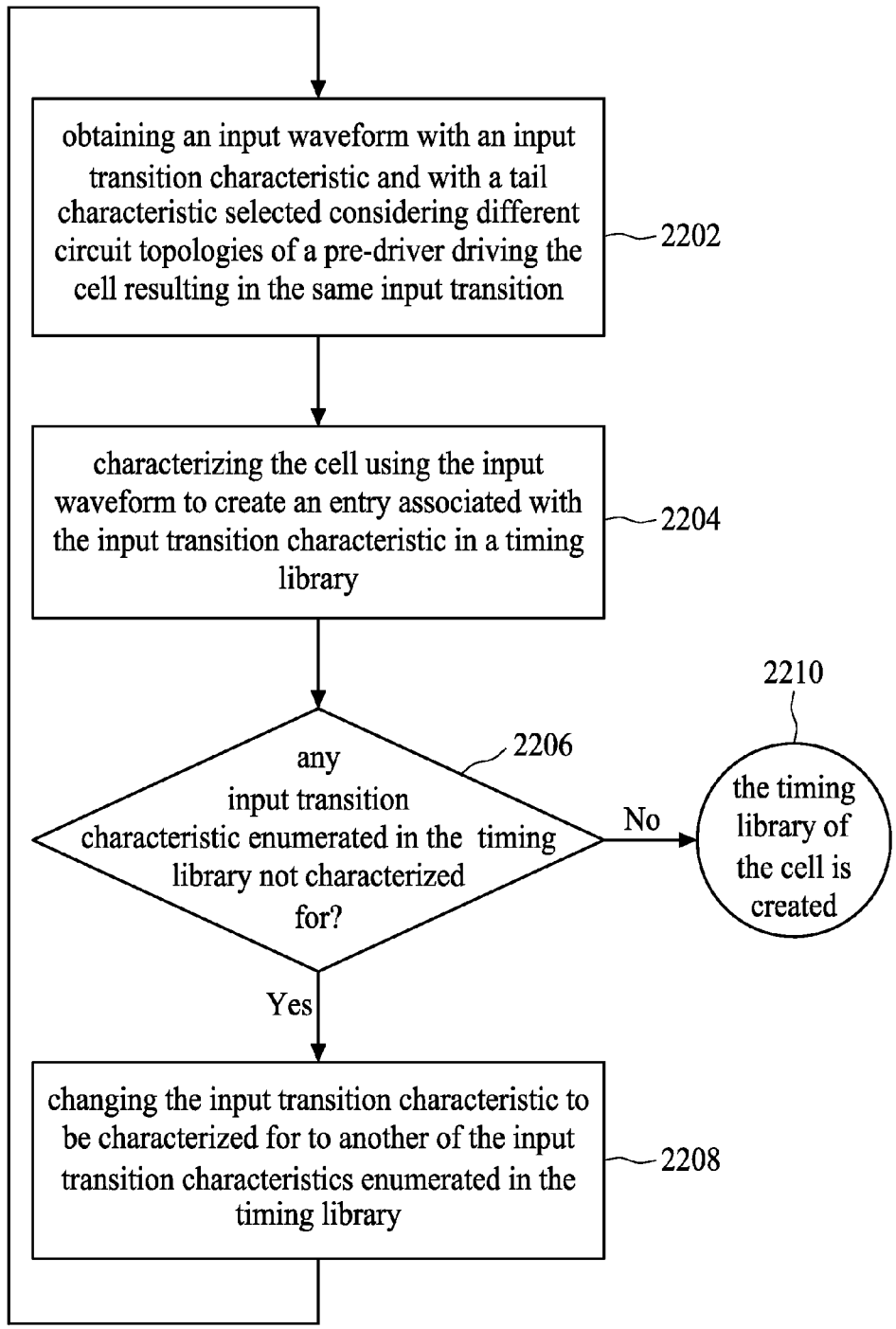
FIG. 22 is a flow chart of another method for characterizing a cell for delay calculation using input waveform generation considering different circuit topologies generating the same input transition characteristic in accordance with some embodiments.

FIG. 22 is a flow chart of another method 2200 for characterizing a cell for delay calculation using input waveform generation considering different circuit topologies generating the same input transition characteristic in accordance with some embodiments. Compared to the method 300 in FIG. 3, the method 2200 uses a single waveform with a representative tail characteristic as an input waveform for characterizing the cell with respect to an input transition characteristic. In operation 2202, an input waveform with an input transition characteristic and a tail characteristic selected considering different circuit topologies of a pre-driver driving the cell resulting in the same input transition characteristic is obtained. In operation 2204, the cell is characterized using the input waveform to create an entry associated with the input transition characteristic in a timing library. In operation 2206, whether there is any input transition characteristic enumerated in the timing library not characterized for is checked. If so, in operation 2208, the input transition characteristic to be characterized for is changed to another of the input transition characteristics enumerated in the timing library and the method loops back to the operation 2202. If not, at a terminating point or a connecting point 2210, the timing library of the cell is created. The operations 2204 and 2206 are similar to operations 302 and 304 in FIG. 3 except a representative input waveform is for characterizing the cell with respect to an input transition characteristic. The different embodiments for implementing the operation 302 can be adapted for implementing the operation 2202, as described in more detail below. An embodiment for the operation 2204 which is different from the embodiments for operation 304 is also provided below. The operations 2206, 2208 and 2210 are similar to operations 306, 308 and 310 in FIG. 3, and are omitted to be further described.

Figure 23:
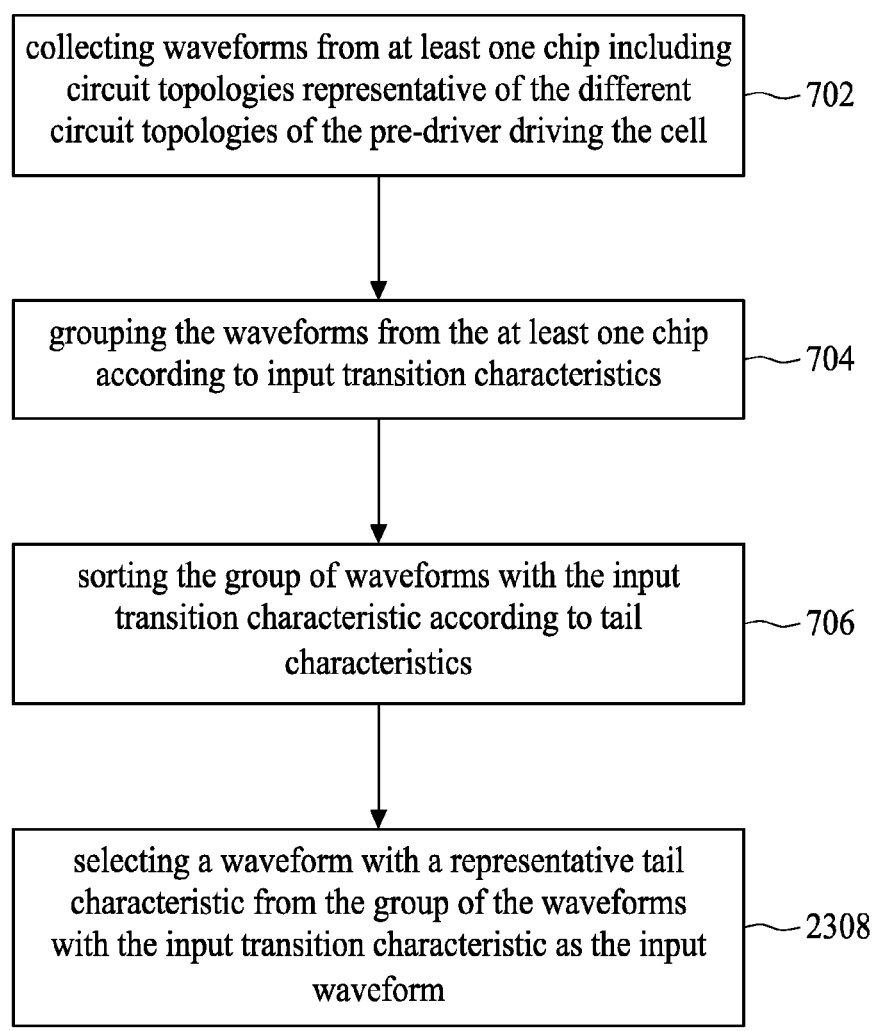
FIG. 23 is a flow chart of a method implementing the operation 2202 in FIG. 22 in accordance with some embodiments.

FIG. 23 is a flow chart of a method implementing the operation 2202 in FIG. 22 in accordance with some embodiments. Compared to the method described with reference to FIG. 7, the method in FIG. 23 includes operations 702, 704 and 708 which are the same as the operations 702, 704 and 706 in the method in FIG. 7, and an operation 2308 which is different from the operation 708 in the method in FIG. 7. The operations in FIG. 23 that are the same as the operations in FIG. 7 are omitted to be described. In operation 2308, a waveform with a representative tail characteristic from the group of waveforms with the input transition characteristic is selected as the input waveform. In some embodiments, similar to operation 708 in FIG. 7, the median tail characteristic is selected as the representative tail characteristic. The method for locating the median tail characteristic have been described in detail with reference to FIG. 9 and is omitted here. Similar to the embodiments described with reference to FIG. 7, in some embodiments the operations 702, 704 and 706 in the method in FIG. 3 are not repetitively performed each time as the method 2200 in FIG. 22 loops back to perform the operation 2202 for a different input transition characteristic.

Figure 24:
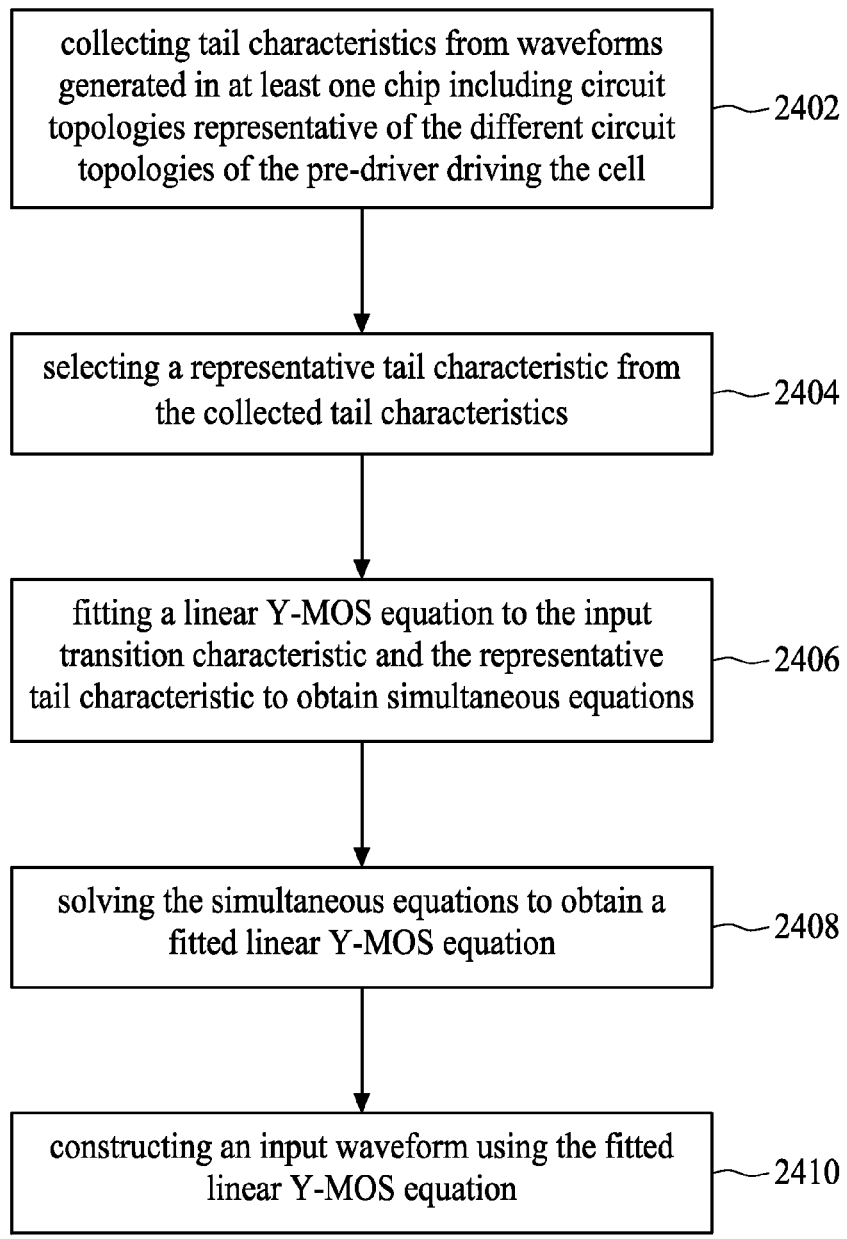
FIG. 24 is a flow chart of another method implementing the operation 2202 in FIG. 22 in accordance with some embodiments.

FIG. 24 is a flow chart of another method implementing the operation 2202 in FIG. 22 in accordance with some embodiments. Compared with the method described with reference to FIG. 10, the method in FIG. 24 includes operations 2402, 2408 and 2410 that are the same as the operations 1002, 1008 and 1010 in the method in FIG. 10, and operations 2404 and 2406 which are different from the operations 1004 and 1006 in FIG. 10. The operation 2402 which is the same as the operation 1002 is omitted to be described. In operation 2404, a representative tail characteristic from the collected tail characteristics is selected. The operation 2404 is different from the operation 1004 in that a single representative tail characteristic is selected from the collected tail characteristics. The method for selecting a representative tail characteristic for operation 2404 is similar to that for operation 1004 and is omitted here. In operation 2406, a linear Y-MOS equation is fitted to the input transition characteristic and the representative tail characteristic to obtain simultaneous equations. The operations 2408 and 2410 which are the same as the operations 1008 and 1010 are omitted to be described.

Figure 25:
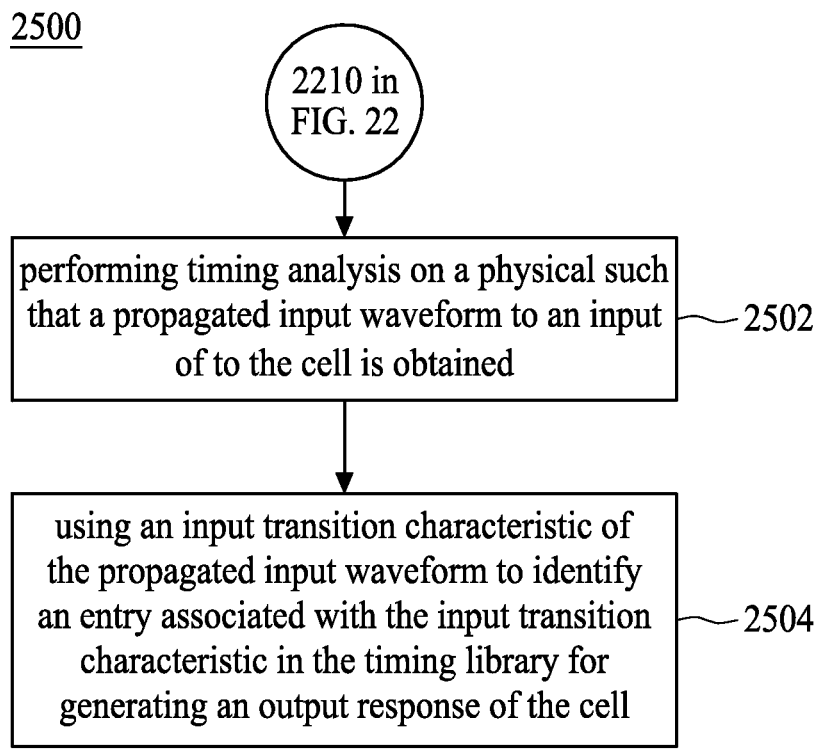
FIG. 25 is a flow chart of a method for performing waveform propagation during performing timing analysis on a physical netlist in accordance with some embodiments.

FIG. 25 is a flow chart of a method 2500 for performing waveform propagation during performing timing analysis on a physical netlist in accordance with some embodiments. Compared to the method 1450 in FIG. 14 and the method 1650 in FIG. 16, the method 2500 uses only the input transition characteristic to identify a corresponding entry for generating an output response of the cell. After the timing library of the cell is created at the connecting point 2210, the method 2500 is performed using the timing library. In some embodiments the method 2500 is performed at the physical verification and electrical signoff stage 162 in FIG. 1. In some embodiments, the method 2500 is performed by the timing analysis tool 25 in FIG. 2. In operation 2502, timing analysis is performed on the physical netlist such that a propagated input waveform to an input of the cell is obtained. The operation 2502 is similar to the operation 1452 in FIG. 14, and is omitted here. In operation 2504, an input transition characteristic of the propagated input waveform is used to identify an entry associated with the input transition characteristic in the timing library for generating an output response of the cell. The operation 2504 is similar to the operations 1454 and 1456 in FIG. 14 except the entry found using the input transition characteristic of the propagated input waveform is directly used to generate the output response of the cell and waveform matching for identify one of the entries under the input transition characteristic is omitted.

In the embodiments described with reference to FIGS. 22 to 25, the cell is fully characterized with respect to an input waveforms with the median tail characteristic representative of the tail characteristics of the different input waveforms constructed using the different circuit topologies of the pre-driver driving the cell resulting in the same input transition characteristic. By adopting the median tail characteristic for constructing the input waveform for characterizing the cell, distortion in the propagated input waveform with respect to the input waveform used to characterize the cell is more likely reduced. Therefore, the output response of the cell is generated using the model characterized using the input waveform more likely better resembles the distorted propagated input waveform and is more likely more accurate.

Figure 26:
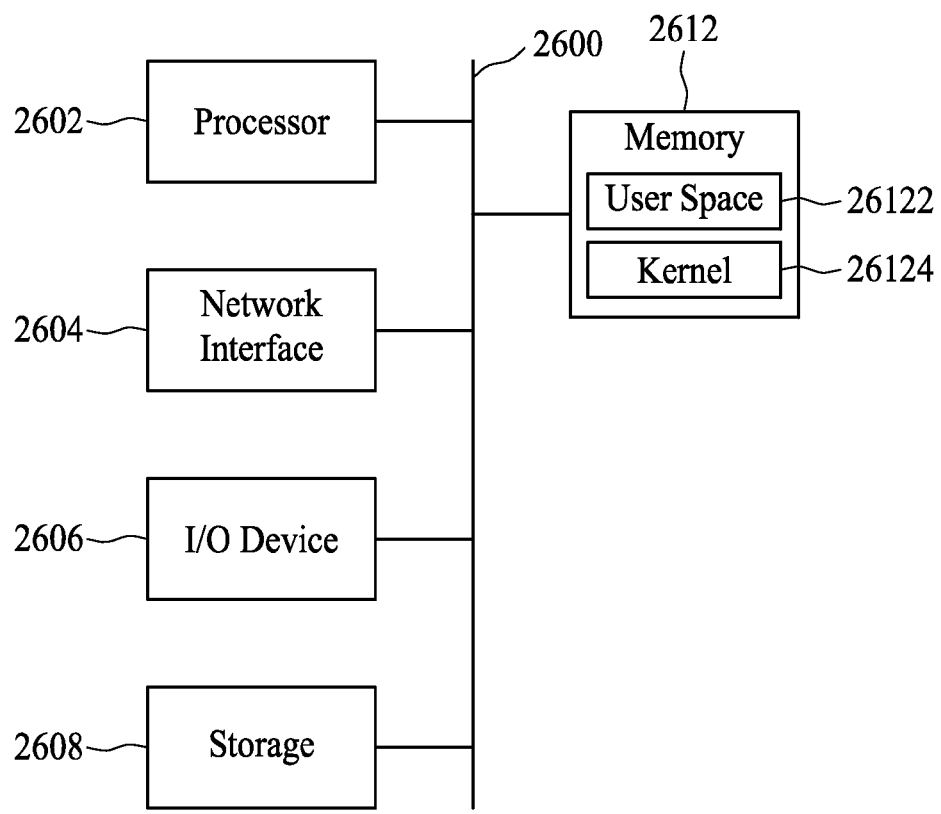
FIG. 26 is a block diagram of a hardware system for implementing the software system embodiments described with reference to FIG. 2 and method embodiments described with reference to FIGS. 3-25 in accordance with some embodiments.

FIG. 26 is a block diagram of a hardware system 2600 for implementing the software system embodiments described with reference to FIG. 2 and method embodiments described with reference to FIGS. 3-25 in accordance with some embodiments. The system 2600 includes at least one processor 2602, a network interface 2604, an input and output (I/O) device 2606, a storage 2608, a memory 2612, and a bus 2610. The bus 2610 couples the network interface 2604, the I/O device 2606, the storage 2608 and the memory 2612 to the processor 2602.

In some embodiments, the memory 2612 comprises a random access memory (RAM) and/or other volatile storage device and/or read only memory (ROM) and/or other non-volatile storage device. The memory 2612 includes a kernel 26124 and user space 26122, configured to store program instructions to be executed by the processor 2602 and data accessed by the program instructions.

In some embodiments, the network interface 2604 is configured to access program instructions and data accessed by the program instructions stored remotely through a network. The I/O device 2606 includes an input device and an output device configured for enabling user interaction with the system 2600. The input device comprises, for example, a keyboard, a mouse, etc. The output device comprises, for example, a display, a printer, etc. The storage device 2608 is configured for storing program instructions and data accessed by the program instructions. The storage device 2608 comprises, for example, a magnetic disk and an optical disk.

In some embodiments, when executing the program instructions, the processor 2602 is configured as the software system 2 described with reference to FIG. 2 or configured to perform methods described with reference to FIGS. 3-25.

In some embodiments, the program instructions are stored in a non-transitory computer readable recording medium such as one or more optical disks, hard disks and non-volatile memory devices.

In some embodiments, in a method performed by at least one processor, a cell is characterized, by the at least one processor, with respect to an input transition characteristic considering different circuit topologies of a pre-driver driving the cell resulting in the same input transition characteristic.

In some embodiments, a system includes at least one processor and at least one memory. The at least one processor is configured to execute program instructions which configure the at least one processor as a library-creating tool. The library-creating tool is configured to characterize a cell with respect to an input transition characteristic considering different circuit topologies of a pre-driver driving the cell resulting in the same input transition characteristic. The at least one memory is configured to store the program instructions.

The above description includes exemplary operations, but these operations are not necessarily required to be performed in the order shown. Operations may be added, replaced, changed order, and/or eliminated as appropriate, in accordance with the spirit and scope of the disclosure. Accordingly, the scope of the disclosure should be determined with reference to the following claims, along with the full scope of equivalences to which such claims are entitled.

What is claimed is:

1. A method, comprising:
   characterizing, by at least one processor, a cell with respect to an input transition characteristic considering different circuit topologies of a pre-driver driving the cell resulting in the input transition characteristic, the characterizing comprising:
   obtaining an input waveform with the input transition characteristic and a representative first characteristic, the different circuit topologies of the pre-driver driving the cell resulting in different first characteristics,
   the representative first characteristic being selected from second characteristics collected from at feast a chip comprising circuit topologies representative of the different circuit topologies of the pre-driver driving the cell; and
   characterizing the cell using the input waveform to create an entry associated with the input transition characteristic in a library;
   generating a design layout based on performing circuit simulation using the entry in the library; and
   manufacturing an integrated circuit (IC) chip using the design layout.

2. The method of claim 1, wherein
   the obtaining the input waveform with the input transition characteristic and the representative first characteristic comprises:
   collecting waveforms from the at least one chip comprising the circuit topologies representative of the different circuit topologies of the pre-driver driving the cell;
   grouping the waveforms from the at least one chip according to input transition characteristics to obtain a group of waveforms with the input transition characteristic;
   sorting the group of waveforms with the input transition characteristic according to the second characteristics; and selecting a waveform with the representative first characteristic from the group of waveforms with the input transition characteristic as the input waveform.

3. The method of claim 1, wherein
the obtaining the input waveform with the input transition characteristic and the representative first characteristic comprises:
    collecting the second characteristics from waveforms generated in the at least one chip comprising the circuit topologies representative of the different circuit topologies of the pre-driver driving the cell;
    selecting the representative first characteristic from the second characteristics; and
    constructing the input waveform with the input transition characteristic by fitting an equation to the input transition characteristic and the representative first characteristic.

4. The method of claim 1, wherein
the representative first characteristic is to tail characteristic;
the input transition characteristic involves a first portion of the input waveform; and
the tail characteristic involves a second portion of the input waveform after the first portion of the input waveform.

5. The method of claim 1, wherein
the representative first characteristic comprises a ratio;
a numerator of the ratio is one of the input transition characteristic based on a first portion of the input waveform and a supplemental input transition characteristic based on a second portion of the input waveform;
a denominator of the ratio is the other of the input transition characteristic based on the first portion of the input waveform and the supplemental input transition characteristic based on the second portion of the input waveform; and
the first portion of the input waveform is different from the second portion of the input waveform.

6. A method comprising:
characterizing, by at least one processor, a cell with respect to an input transition characteristic considering different circuit topologies of a pre-driver driving the cell resulting in the input transition characteristic, the characterizing comprising:
    obtaining different input waveforms with the input transition characteristic considering the different circuit topologies, the obtaining comprising:
        obtaining the different input waveforms with the input transition characteristic and different first characteristics,
            the different circuit topologies of the pre-driver driving the cell resulting in the different first characteristics, and
            the different first characteristics being selected from second characteristics collected from at least a chip comprising circuit topologies representative of the different circuit topologies of the pre-driver driving the cell;
    characterizing the cell using the different input waveforms to create entries associated with the input transition characteristic and the different circuit topologies in a library;
generating a design layout based on performing circuit simulation using at least one entry of the entries in the library; and
manufacturing an integrated circuit (IC) chip using the design layout.

7. The method of claim 6, wherein
the obtaining the different input waveforms with the input transition characteristic and the different first characteristics comprises:
    collecting waveforms from the at least one chip comprising the circuit topologies representative of the different circuit topologies of the pre-driver driving the cell;
    grouping the waveforms from the at least one chip according to input transition characteristics to obtain a group of waveforms with the input transition characteristic; and
    sorting the group of waveforms with the input transition characteristic according to the second characteristics; and
    selecting a waveform with a representative first characteristic from the group of waveforms with the input transition characteristic, and other waveforms with third characteristics within a range that comprises the representative first characteristic and encompasses at least 50% of occurrences of the second characteristics in the at least one chip as the input waveforms with the different first characteristics.

8. The method of claim 6, wherein
the obtaining the different input waveforms with the input transition characteristic and the different first characteristics comprises:
    collecting the second characteristics from waveforms generated in the at least one chip comprising the circuit topologies representative of the different circuit topologies of the pre-driver driving the cell;
    selecting a representative first characteristic from the collected first characteristics, and other third characteristics within a range that comprises the representative first characteristic and encompasses at least 50% of occurrences of the second characteristics in the at least one chip as the different first characteristics; and
    constructing the different input waveforms by fitting an equation to the input transition characteristic and each of the different first characteristics.

9. The method of claim 6, wherein
a characteristic of the different first characteristics is a tail characteristic;
the input transition characteristic involves a first portion of a corresponding input waveform of the different input waveforms to the characteristic of the different first characteristics; and
the tail characteristic involves a second portion of the corresponding input waveform after the first portion of the corresponding input waveform.

10. The method of claim 6, wherein
a characteristic of the different first characteristics comprises a ratio;
a numerator of the ratio is one of the input transition characteristic based on a first portion of a corresponding input waveform of the different input waveforms to the characteristic of the different first characteristics and a supplemental input transition characteristic based on a second portion of the corresponding input waveform;
a denominator of the ratio is the other of the input transition characteristic based on the first portion of the corresponding input waveform and the supplemental input transition characteristic based on the second portion of the corresponding input waveform; and the first portion of the corresponding input waveform is different from the second portion of the corresponding input waveform.

11. The method of claim 6, wherein the characterizing the cell using the different input waveforms to create the entries associated with the input transition characteristic in the library, comprises:
  for each of the different input waveforms, creating a corresponding one of the entries used independently from the other of the entries in the library; and
the generating comprises:
  performing the circuit simulation on a netlist such that a propagated input waveform with the input transition characteristic to the cell is matched with the different input waveforms to identify one of the entries being the at least one entry of the entries in the library for generating an output response of the cell.

12. The method of claim 6, wherein the characterizing the cell using the different input waveforms to create the entries associated with the input transition characteristic and the different circuit topologies in the library, comprises:
  for at least one input waveform of the different input waveforms,
creating at least one first entry in the entries used independently from second entries in the entries in the library, and for the other input waveforms of the different input waveforms, creating the second entries in the entries used dependently from the at least one first entry in the library; and
the generating the design layout based on performing the circuit simulation using the at least one entry of the entries in the library comprises:
  performing the circuit simulation on a netlist such that a propagated input waveform with the input transition characteristic to the cell is projected into a space of input waveforms with varying circuit topologies comprising the different circuit topologies to determine an amount of correction of an output response generated using one first entry of the at least one first entry based on at least one second entry of the second entries;
  the one first entry of the at least one first entry and the at least one second entry of the second entries being the at least one entry of the entries.

13. A method, comprising:

characterizing, by at least one processor, a cell with respect to an input transition resulting in the input transition characteristic, the characterizing comprising:
  obtaining different input waveforms with the input transition characteristic considering the different circuit topologies, the obtaining comprising:
    receiving different netlists of the pre-driver driving the cell configured in the different circuit topologies; and
      the different netlists comprises a first netlist and a second netlist of the pre-driver driving the cell;
      in the first netlist, the pre-driver drives the cell through a longer wire but has as smaller fanout; and
      in the second netlist, the pre-driver drives the cell through a shorter wire but has a larger fanout;
    constructing the different input waveforms using the different netlists of the pre-driver driving the cell;
  characterizing the cell using the different input waveforms to create entries associated with the input transition characteristic and the different circuit topologies in a library;
generating a design layout based on performing circuit simulation using at least one entry of the entries in the library; and
manufacturing an integrated circuit (IC) chip using the design layout.

14. A system, comprising:

at least one memory configured to store program instructions;
at least one processor, configured to execute the program instructions which configure the at least one processor as:
  a library-creating tool configured to characterize a cell with respect to an input transition characteristic considering different circuit topologies of a pre-driver driving the cell resulting in the input transition characteristic, the library-creating tool comprising:
    a waveform-obtaining module configured to obtain an input waveform with the input transition characteristic and a representative first characteristic, the different circuit topologies of the pre-driver driving the cell resulting in different first characteristics,
      the representative first characteristic being selected from second characteristics collected from at least a chip comprising circuit topologies representative of the different circuit topologies of the pre-driver driving the cell; and
    a cell-characterizing module configured to characterize the cell using the input waveform to create an entry associated with the input waveform in a library;
  a layout generating tool configured to generate a design layout based on performing circuit simulation using the entry in the library; and
  a manufacturing tool configured to manufacture an integrated circuit (IC) chip using the design layout.

15. The system of claim 14, wherein the waveform-obtaining module obtains the input waveform with the input transition characteristic and the representative first characteristic by performing operations comprising:
  collecting waveforms from the at least one chip comprising the circuit topologies representative of the different circuit topologies of the pre-driver driving the cell;
  grouping the waveforms from the at least one chip according to input transition characteristics to obtain a group of waveforms with the input transition characteristic;
  sorting the group of waveforms with the input transition characteristic according to the second characteristics; and
  selecting a waveform with the representative first characteristic from the group of waveforms with the input transition characteristic as the input waveform.

16. The system of claim 14, wherein the representative first characteristic is a tail characteristic;
the input transition characteristic involves a first portion of the input waveform; and
the tail characteristic involves a second portion of the input waveform after the first portion of the input waveform.

17. A system, comprising:
at least one memory configured to store program instructions;
at least one processor, configured to execute the program instructions which configure the at least one processor as:
  a library-creating tool configured to characterize a cell with respect to an input transition characteristic considering different circuit topologies of a pre-driver driving the cell resulting in the input transition characteristic, the library-creating tool comprising:
    a waveform-Obtaining module configured to obtain different input waveforms with the input transition characteristic considering the different circuit topologies, the waveform-obtaining module obtains by performing operations comprising:
      collecting waveforms from the at least one chip comprising the circuit topologies representative of the different circuit topologies of the pre-driver driving the cell;
      grouping the waveforms from the at least one chip according to input transition characteristics to obtain a group of waveforms with the input transition characteristic; and
      sorting the group of waveforms with the input transition characteristic according to first characteristics; and
      selecting a waveform with a representative first characteristic from the group of waveforms with the input transition characteristic, and other waveforms with second characteristics within a range that comprises the representative first characteristic and encompasses at least 50% of occurrences of the first characteristics in the at least one chip as the different input waveforms; and
    a cell-characterizing module configured to characterize the cell using the different input waveforms to create entries associated with the input transition characteristic and the different circuit topologies in a library; and
  a layout generating tool configured to generate a design layout based on performing circuit simulation using at least one entry of the entries in the library; and
a manufacturing tool configured to manufacture an integrated circuit (IC) chip using the design layout.

18. The system claim 17, wherein
the cell-characterizing module characterizes the cell using the different input waveforms to create the entries associated with the input transition characteristic in the library by performing operations comprising:
  creating a corresponding one of the entries used independently from the other of the entries in the library for each of the different input waveforms; and
the layout generating tool generates the design layout based on performing the circuit simulation using the at least one entry of the entries in the library by performing operations comprising:
  performing the circuit simulation on a netlist such that a propagated input waveform with the input transition characteristic to the cell is matched with the different input waveforms to identify one of the entries being the at least one entry of the entries in the library for generating an output response of the cell.

19. The system of claim 17, wherein
the cell-characterizing module characterizes the cell using the different input waveforms to create the entries associated with the input transition characteristic in the library by performing operations comprising:
  creating at least one first entry in the entries used independently from second entries in the entries in the library for at least one input waveform of the different input waveforms, and creating the second entries in the entries used dependently from the at least one first entry in the library for the other input waveforms of the different input waveforms; and
the layout generating tool generates the design layout based on performing the circuit simulation using the at least one entry of the entries in the library by performing operations comprising:
  performing the circuit simulation on a netlist such that a propagated input waveform with the input transition characteristic to the cell is projected into a space of input waveforms with varying circuit topologies comprising the different circuit topologies to determine an amount of correction of an output response generated using one first entry of the at least one first entry based on at least one second entry of the second entries;
  the one first entry of the at least one first entry and the at least one second entry of the second entries being the at least one entry of the entries.

20. A system, comprising:
at least one memory configured to store program instructions;
at least one processor, configured to execute the program instructions which configure the at least one processor as:
  a library-creating tool configured to characterize a cell with respect to an input transition characteristic considering different circuit topologies of a pre-driver driving the cell resulting in the input transition characteristic, the library-creating tool comprising:
    a waveform-obtaining module configured to obtain different input waveforms with the input transition characteristic considering the different circuit topologies, the waveform-obtaining module obtains by performing operations comprising:
      receiving different netlists of the pre-driver driving the cell configured in the different circuit topologies; and
        the different netlists comprises a first netlist and a second netlist of the pre-driver driving the cell;
        in the first netlist, the pre-driver drives the cell through a longer wire but has a smaller fanout; and
        in the second netlist, the pre-driver drives the cell through a shorter wire but has a larger fanout;
      constructing the different input waveforms using the different netlists of the pre-driver driving the cell; and
  a layout generating tool configured to generate a design layout based on performing circuit simulation using at least one entry of the entries in the library; and
a manufacturing tool configured to manufacture an integrated circuit (IC) chip using the design layout.

* * * * *